United States Patent
Uei et al.

(10) Patent No.: US 12,113,467 B2
(45) Date of Patent: Oct. 8, 2024

(54) POWER CONVERSION SYSTEM AND MOTOR CONTROL METHOD BASED ON SAME

(71) Applicant: Hitachi Industrial Equipment Systems Co., Ltd., Tokyo (JP)

(72) Inventors: Yusuke Uei, Tokyo (JP); Takuya Ishigaki, Tokyo (JP); Hideto Takada, Tokyo (JP); Yutaka Matsumoto, Tokyo (JP); Masaki Sugiura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 224 days.

(21) Appl. No.: 17/791,413

(22) PCT Filed: Oct. 22, 2020

(86) PCT No.: PCT/JP2020/039782
§ 371 (c)(1),
(2) Date: Jul. 7, 2022

(87) PCT Pub. No.: WO2021/140723
PCT Pub. Date: Jul. 15, 2021

(65) Prior Publication Data
US 2023/0029493 A1 Feb. 2, 2023

(30) Foreign Application Priority Data
Jan. 9, 2020 (JP) ................ 2020-001962

(51) Int. Cl.
*H02P 27/00* (2006.01)
*H02P 21/18* (2016.01)
*H02P 21/20* (2016.01)
*H02P 27/08* (2006.01)

(52) U.S. Cl.
CPC .............. *H02P 27/08* (2013.01); *H02P 21/18* (2016.02); *H02P 21/20* (2016.02); *H02P 2201/09* (2013.01)

(58) Field of Classification Search
CPC .......... H02P 27/08; H02P 21/18; H02P 21/20; H02P 2201/09
See application file for complete search history.

(56) References Cited

U.S. PATENT DOCUMENTS

2004/0165868 A1  8/2004  Sato et al.

FOREIGN PATENT DOCUMENTS

DE   10 2011 011 234 A1   11/2011
EP         2587659 A1 *  5/2013  ......... B29C 45/7666
(Continued)

OTHER PUBLICATIONS

International Search Report (PCT/ISA/210) issued in PCT Application No. PCT/JP2020/039782 dated Jan. 19, 2021 with English translation (four (4) pages).
(Continued)

*Primary Examiner* — Karen Masih
(74) *Attorney, Agent, or Firm* — Crowell & Moring LLP

(57) ABSTRACT

A power conversion system includes a power conversion device supplying electric power to a motor and a power supply device supplying electric power to the power conversion device. The power conversion device includes a reverse converter that converts the electric power, a control circuit that controls the reverse converter, and a current detector that detects current flowing through the reverse converter. The power supply device includes a storage device that stores electric power in accordance with a voltage, a step-up/down power supply circuit that changes the voltage of the storage device based on a voltage command, and a voltage command computing circuit that com-
(Continued)

putes the energy stored in the storage device and output it as the voltage command to the step-up/down power supply circuit. When the characteristics of the motor are restricted, the voltage command computing circuit temporarily changes the voltage command to improve the motor characteristics.

7 Claims, 15 Drawing Sheets

(56) References Cited

FOREIGN PATENT DOCUMENTS

| | | |
|---|---|---|
| JP | 2003-15254 A | 1/2003 |
| JP | 2006-194133 A | 7/2006 |
| JP | 2011-200048 A | 10/2011 |
| JP | 2013-211957 A | 10/2013 |
| JP | 2015-6021 A | 1/2015 |

OTHER PUBLICATIONS

Japanese-language Written Opinion (PCT/ISA/237) issued in PCT Application No. PCT/JP2020/039782 dated Jan. 19, 2021 (five (5) pages).
Extended European Search Report issued in European Application No. 20912793.5 dated Dec. 21, 2023 (9 pages).
Japanese-language Office Action issued in Japanese Application No. 2020-001962 dated Jul. 4, 2023 with English translation (10 pages).

\* cited by examiner

FIG. 3
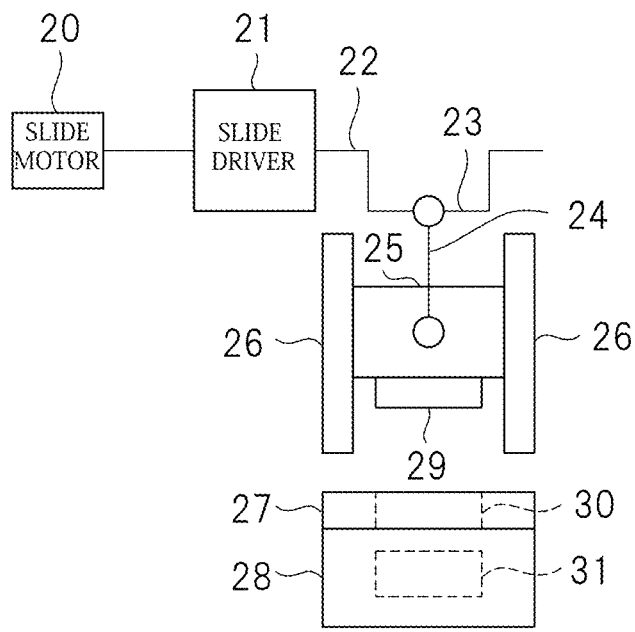
FIG. 4
CASE OF STORING ENERGY IN PNEUMATIC DIE CUSHION
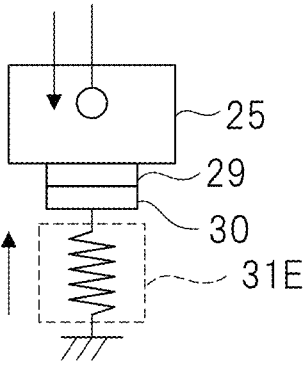
STORED ENERGY E
$$E = \frac{1}{2}kx^2 \quad (J)$$
CASE OF RELEASING ENERGY FROM PNEUMATIC DIE CUSHION
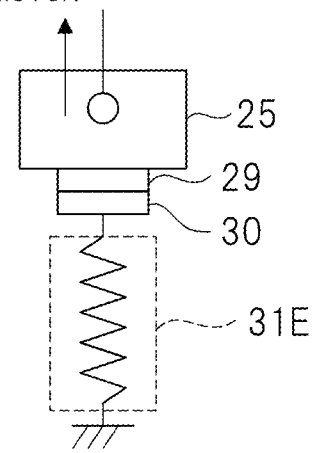

POWER CONVERSION SYSTEM AND MOTOR CONTROL METHOD BASED ON SAME

TECHNICAL FIELD

The present invention relates to a power conversion system and a motor control method based on the same, and relates to, for example, a power conversion system having a storage device capable of storing (accumulating) energy and a motor control method based on the same.

BACKGROUND ART

A power supply device and a power supply system having a storage device are described in, for example, Patent Document 1. Patent Document 1 describes that control command values of a storage device are variably set based on the energy accumulated in the device.

RELATED ART DOCUMENT

Patent Document

Patent Document 1: Japanese Unexamined Patent Application Publication No. 2011-200048

SUMMARY OF THE INVENTION

Problems to be Solved by the Invention

Patent Document 1 describes that the control command values of the storage device are variably set and controlled based on rotational energy, which is accumulated in a motor and an inertial load such as a motor load, or spring energy in order to provide a low-cost, low-loss, and high-density power supply device.

Generally, when the output of a storage device is restricted by control command values, the characteristics of a motor cannot be maximally exerted in some cases. However, depending on uses, the increase of the output of the storage device is sometimes demanded in order to improve the motor characteristics even when it is restricted. The present invention has been made in view of such demands.

Means for Solving the Problems

The present application includes plural means for solving the problem. An example of a power conversion system according to an embodiment is described as follows.

That is, a power conversion system includes a power conversion device configured to supply electric power to a motor and a power supply device configured to supply electric power to the power conversion device. Herein, the power conversion device includes a power conversion unit configured to convert the electric power, a control unit configured to control the power conversion unit, and a current detection unit configured to detect a current flowing through the reverse conversion unit. Also, the power supply device includes a storage device configured to store electric power in accordance with a voltage, a step-up/down power supply circuit configured to change the voltage of the storage device based on a voltage command, and a computing circuit configured to compute the energy stored in the storage device and output it as the voltage command to the step-up/down power supply circuit. The control unit calculates powered drive energy of the motor by using information from an encoder of the motor and a current value detected by the current detection unit. The computing circuit computes the energy stored in the storage device based on the powered drive energy calculated by the control unit. When it is determined by the computation of the current value detected by the current detection unit, the information from the encoder, and the energy stored in the storage device that characteristics of the motor are restricted, the computing circuit temporarily changes the voltage command to improve the characteristics of the motor.

Effects of the Invention

According to an embodiment, it is possible to provide a power conversion system capable of temporarily improving motor characteristics even in a state in which the motor characteristics are restricted.

BRIEF DESCRIPTION OF THE DRAWINGS

FIG. 3 is a diagram for schematically describing a structure of a press machine equipped with a pneumatic die cushion;

FIG. 4 is a diagram for describing the energy stored in a pneumatic die cushion device;

DETAILED DESCRIPTION OF PREFERRED EMBODIMENTS

Figure 1:
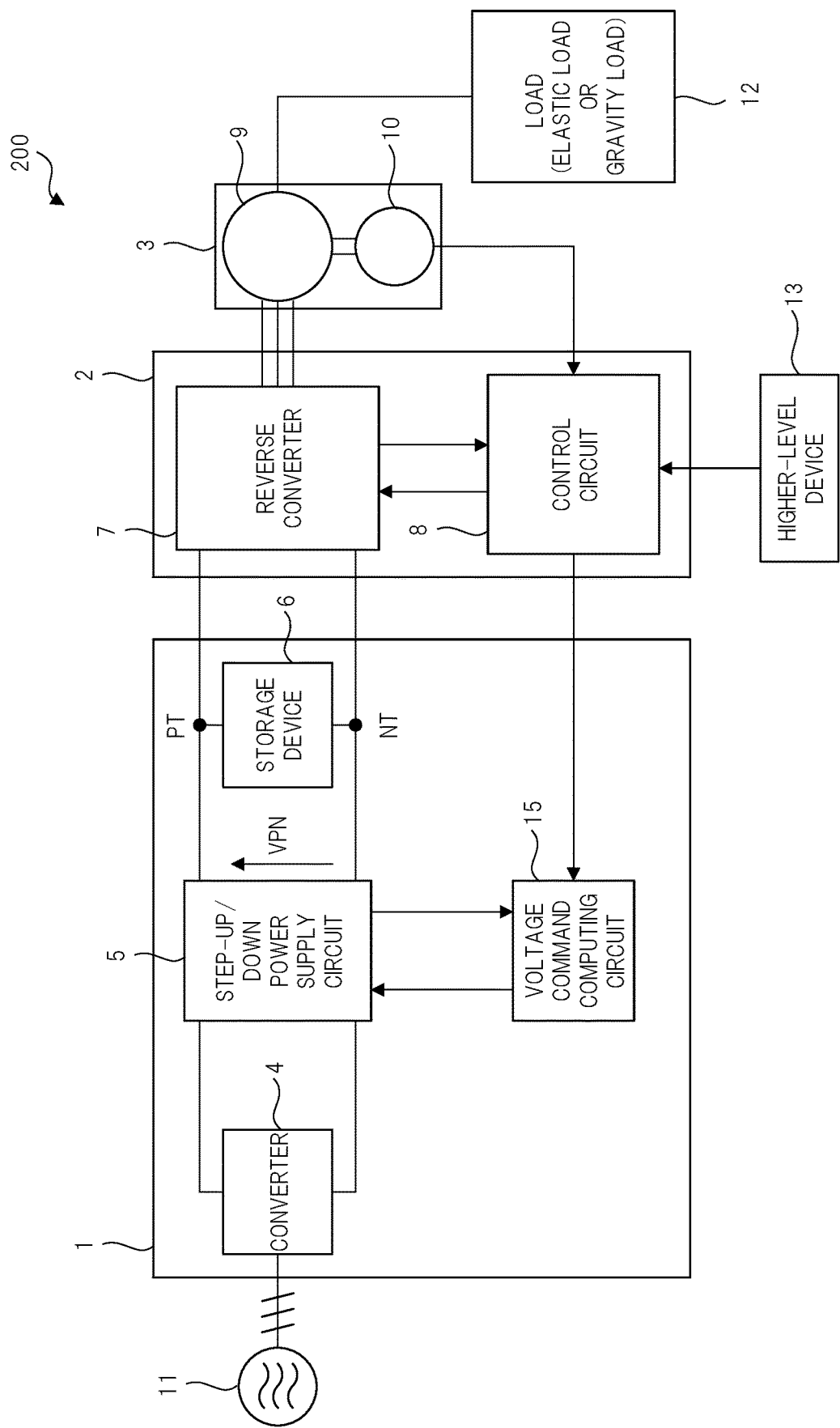
FIG. 1 is a block diagram schematically illustrating an overall configuration of a power conversion system according to the first embodiment.

Hereinafter, embodiments of the present invention will be described with reference to drawings. Note that the disclosure is merely examples, and any alteration that is easily made by a person skilled in the art while keeping a gist of the present invention is of course included in the range of the present invention. In addition, the drawings schematically illustrate widths, numbers, shapes, and the like of each portion as compared to actual aspects in order to make the description clearer, but the drawings are mere examples and do not limit the interpretation of the present invention.

Further, the same reference characters are applied to the same elements as those described in relation to the foregoing drawings in the present specification and the respective drawings, and detailed descriptions thereof will be appropriately omitted in some cases.

First Embodiment

<Overall Configuration and Principles of Power Conversion System>

FIG. 1 is a block diagram schematically illustrating an overall configuration of a power conversion system according to the first embodiment. With reference to the drawing, basic principles of the power conversion system according to the first embodiment will be described.

In FIG. 1, 200 denotes the power conversion system. The power conversion system 200 includes various devices. However, FIG. 1 only illustrates a power supply device 1 and a power conversion device (motor power conversion device) 2 necessary for description among these devices. The power conversion system 200 according to this embodiment is connected to a power supply 11, a motor 3, and a higher-level device 13. The power conversion system 200 converts the electric power from the power supply 11 and supplies it to the motor 3, thereby controlling the operations of the motor 3.

The power supply device 1 includes a converter 4 which converts the electric power supplied from the power supply 11 as an AC voltage to a DC voltage VPN, a step-up/down power supply circuit 5 which controls the voltage VPN of the electric power converted to the DC voltage by the converter 4, a voltage command computing circuit 15 which controls the voltage VPN by controlling the operation of the step-up/down power supply circuit 5, and a storage device 6 which stores the electric power whose voltage is controlled by the step-up/down power supply circuit 5 and supplies the electric power to the power conversion device 2. This storage device 6 includes, for example, an electrolytic capacitor, a secondary battery, etc. and stores the electric power, which is generated by regenerative operations of the motor 3 and supplied via the power conversion device 2, in addition to the electric power from the step-up/down power supply circuit 5.

The power conversion device 2 includes a reverse converter (inverter, power conversion unit) 7 and a control circuit 8. The reverse converter 7 controls the operation of the motor 3 by converting the electric power supplied from the step-up/down power supply circuit 5 via the storage device 6 and supplying it to the motor 3, and supplies the electric power generated by regenerative operation of the motor 3 to the storage device 6.

The control circuit 8 controls the operation of the reverse converter 7 and calculates accumulated energy, which is the energy accumulated in the motor 3 and a motor load 12 driven by the motor 3, based on the information about the motor 3. In the embodiment, a rotary drive motor composed of an AC motor 9 and an encoder 10 is used as the motor 3. Examples of the information about the motor 3 includes the angular velocity of the AC motor 9, the torque of the AC motor 9 computed based on the current value detected by a current detector (not illustrated) provided in the motor 3, and the moment related to the AC motor 9 set in advance. Although not particularly limited, the angular velocity of the AC motor 9 is supplied from the encoder 10 to the control circuit 8, and the current value from the current detector is supplied from the reverse converter 7 to the control circuit 8. Also, the moment of the AC motor 9 is set in the control circuit 8 in advance. Based on the information, the control circuit 8 calculates the accumulated energy, which is the sum of the energy accumulated in the motor 3 and the energy accumulated in the motor load 12 coupled to the motor 3, and outputs it to the voltage command computing circuit 15.

The voltage command computing circuit 15 controls the step-up/down power supply circuit 5 based on the accumulated energy calculated by the control circuit 8 and the maximum amount of electric power determined in advance as a maximum value of the amount of electric power allowed to be stored in the storage device 6, and controls the amount of electric power stored in the storage device 6 from the power supply 11. Note that the step-up/down power supply circuit 5 and the voltage command computing circuit 15 can be regarded as constituting a storage device control circuit which controls the amount of electric power stored to the storage device 6 from the power supply 11 based on the accumulated energy and the maximum power amount.

The motor load 12 is composed of an elastic load or/and a gravity load. If the motor 3 is the rotary drive AC motor 9 as described above, the rotation of the AC motor 9 rotates an output shaft of the AC motor 9, and the rotational energy thereof is stored on the load side (motor load 12) including the output shaft. Meanwhile, if the motor 3 includes a linear motor or the like instead of the rotary drive AC motor 9, a movable part mounted with a load moves along a straight line, and kinetic energy is stored on the load side and the movable part (motor load 12).

For example, except for a special load in which the rotation angle of the AC motor 9 is moved only by a minute angle such as 10 degrees or less or a special load which moves on a straight line only by a minute distance such as 10 mm or less, in a general industrial machine such as an electronic parts assembling machine, a semiconductor/liquid-crystal manufacturing apparatus, a metal working machine, a metal processing machine, a conveyance machine, or an industrial robot, when an object on the load side moves, rotational or kinetic energy is stored in that object.

The energy stored by the rotation of the AC motor 9 will be described below.

Acceleration/deceleration torque Tα is expressed by (Equation 1) when the inertia moment of a rotating object is J and the angular velocity of the rotation of the output shaft of the AC motor 9 is ω (rad/s).

[Mathematical Expression 1]

$$T\alpha = J \cdot \left(\frac{d\omega}{dt}\right)(N \cdot m) \quad \text{(Equation 1)}$$

Also, if a case in which a crank shaft is coupled to the output shaft of the AC motor 9 to change the rotary motion of the output shaft to reciprocal motion and an operation of applying to and returning from a load having spring characteristics (in a case of an elastic load) is repeated is considered, elastic load torque Td with respect to the spring characteristics is expressed by (Equation 2) when the motor load torque including that during acceleration and deceleration is Tq (N·m). Note that it is assumed that friction load, rolling friction, and the other loads at this time are minute at an ignorable level.

[Mathematical Expression 2]

$Td \approx$ (elastic load torque except acceleration/deceleration torque)

$= Tq - T\alpha \ (N \cdot m)$ \quad (Equation 2)

Inertial load power Pα during generation of the acceleration/deceleration torque of (Equation 1) is expressed by (Equation 3) when a rotation velocity is N (min^(−1)).

[Mathematical Expression 3]

$$P\alpha = T\alpha \cdot \omega = \frac{2\pi}{60} \cdot N \cdot T\alpha (W) \quad \text{(Equation 3)}$$

Next, elastic load power Pd during constant angular velocity operation is expressed by (Equation 4).

[Mathematical Expression 4]

$Pd \approx$ (elastic load power except inertial load power)=
$Td \cdot \omega(W)$ \quad (Equation 4)

Herein, when operation is carried out with the power Pα given by (Equation 3), inertial load stored energy Ea stored in the inertial load is expressed by (Equation 5) by subjecting (Equation 3) to time integration.

[Mathematical Expression 5]

$E\alpha = \int (P\alpha) dt (J)$ \quad (Equation 5)

Similarly, when operation is carried out with the power Pd given by (Equation 4), elastic load stored energy Ed stored in the elastic load is expressed by (Equation 6) by subjecting (Equation 4) to time integration.

[Mathematical Expression 6]

$Ed \approx$ (elastic load stored energy except inertial load stored energy)

$\int (Pd) dt (J)$ \quad (Equation 6)

Therefore, total load stored energy E which is obtained by adding the inertial load stored energy Ea and the elastic load stored energy Ed is expressed by (Equation 7).

[Mathematical Expression 7]

$E = E\alpha + Ed (J)$ \quad (Equation 7)

When the AC motor 9 is decelerated and stopped from this state, the inertial load stored energy Ea and the elastic load stored energy Ed stored in the inertial load and the elastic load (or gravity load) are returned to the storage device 6 as regenerative energy from the motor load 12 via the motor 3 and the reverse converter 7. At this time, in order to prevent the storage device 6 from being an overcharged state, the amount of the energy stored in the inertial load and the load side is computed every moment from the beginning of operation of the AC motor 9, the amount corresponding thereto is subtracted from the amount of the energy stored in the storage device 6, and the stored amount of the electric power in the storage device 6 is variably controlled by controlling the voltage command computing circuit 15 by the control circuit 8 such that a specified amount of energy is retained even when the energy generated by regeneration is stored in the storage device 6.

Note that the amount of the energy stored in the inertial load and the load side is not computed from physical power, but it is computed by using control signals detected from sensors or the like provided in the motor 3 or a configuration to drive it. This is because the inertia moment and elastic load characteristics (or gravity load characteristics) can be accurately obtained from the current and voltage of the AC motor 9, the position, velocity, and angular velocity of the output shaft, and power and energy. For example, in a case of an elastic load, the spring characteristics or the like using the restoring force of compressed air have a useful life, and the characteristics are deteriorated before the life ends. However, even in such a case, the load characteristics corresponding to aging degradation can be correctly captured by the sensors of the motor 3 and the configuration to drive it. Conversely, if operation is carried out with the spring characteristics unchanged from initial constants and the amount of energy is to be computed from physical power, a state dissociated from actual characteristics is computed, and deterioration or errors may occur in control accuracy of the operation of the motor 3 or the like.

According to the law of energy conservation, an appropriate energy amount Eref stored in the storage device 6 is expressed by (Equation 8) when the energy stored in the storage device 6 when the device is fully charged is Emax (J).

[Mathematical Expression 8]

$Eref = Emax - (E\alpha + Ed)(J)$ \quad (Equation 8)

For example, when an electrolytic capacitor having a capacity C (F) is used as the storage device 6, appropriate energy stored in the electrolytic capacitor is expressed by (Equation 9) when an appropriate voltage of the electrolytic capacitor is Vref (V).

[Mathematical Expression 9]

$$Eref = \frac{1}{2} \cdot C \cdot Vref^2 \quad \text{(Equation 9)}$$

When (Equation 8) is substituted into (Equation 9) and sorted out, the appropriate voltage Vref of the electrolytic capacitor of the storage device 6 in the case of the elastic load is expressed by (Equation 10).

[Mathematical Expression 10]

$Vref = \sqrt{k\{Emax - (E\alpha + Ed)\}}$ \quad (Equation 10)

Herein, a constant k in (Equation 10) is expressed by (Equation 11).

[Mathematical Expression 11]

$$K=2/C \qquad \text{(Equation 11)}$$

Next, gravity load will be described. Also in this case, torque, power, and stored energy are considered as in the case of elastic load described above. The acceleration/deceleration torque in the case of the gravity load is the same as that of (Equation 1) described above. As the gravity load, for example, the case in which a hoist is coupled to the output shaft of the motor 3 and a basket or a package suspended at an end of a rope of the hoist is lifted up and down by the hoist is conceivable.

Gravity load torque Tw is expressed by (Equation 12) when the motor torque including that during acceleration/deceleration is Tq (N·m). Note that it is assumed that friction load, rolling friction, and the other loads at this time are minute at an ignorable level.

[Mathematical Expression 12]

$Tw \approx$ (gravity load torque except acceleration/deceleration torque)

$$Tq-T\alpha(N \cdot m) \qquad \text{(Equation 12)}$$

Next, gravity load power Pw during constant angular velocity operation is expressed by (Equation 13).

[Mathematical Expression 13]

$Pw \approx$ (gravity load power except inertial load power)

$$Tw \cdot \omega(W) \qquad \text{(Equation 13)}$$

If operation is carried out with the gravity load power Pw given by (Equation 13), gravity load stored energy stored in the gravity load is expressed by (Equation 14) by subjecting (Equation 13) to time integration.

[Mathematical Expression 14]

$Ew \approx$ (gravity load energy except inertial load stored energy) $\qquad$ (Equation 14)

$$= \int (Pw) dt (J)$$

Therefore, total load stored energy E which is obtained by adding the inertial load stored energy Ea and the gravity load stored energy Ew is expressed by (Equation 15).

[Mathematical Expression 15]

$$E=E\alpha+Ew(J) \qquad \text{(Equation 15)}$$

Next, in the case of the gravity load, an appropriate energy amount Eref stored in the storage device 6 is expressed by (Equation 16) when the energy stored in the storage device 6 when the device is fully charged is Emax (J).

[Mathematical Expression 16]

$$Eref=Emax-(E\alpha+Ew)(J) \qquad \text{(Equation 16)}$$

Also, for example, when an electrolytic capacitor having a capacity C (F) is used as the storage device 6, appropriate energy Eref stored in the electrolytic capacitor is expressed by (Equation 9) described above. Therefore, the appropriate voltage Vref of the electrolytic capacitor of the storage device 6 in the case of the gravity load is expressed by (Equation 17) by substituting (Equation 9) described above into (Equation 16) and sorting it out. Note that a constant k is expressed by (Equation 11) described above.

[Mathematical Expression 17]

$$Vref=\sqrt{k\{Emax-(E\alpha+Ew)\}} \qquad \text{(Equation 17)}$$

Herein, when the inertial load stored energy Ea, the elastic load stored energy Ed, and the gravity load stored energy Ew are returned from the load side to the storage device 6 as regenerative energy via the motor 3 and the reverse converter 7 during regeneration, they are partly consumed as a loss because regeneration efficiency is not 100%. Therefore, in the computation in the case of regeneration, the regeneration efficiency is reflected by multiplying each of the inertial load stored energy E$\alpha$, the elastic load stored energy Ed, and the gravity load stored energy Ew by a correction coefficient X1 (<1). Also, by setting a correction coefficient X1 to 1 (X1=1) in the computation in a case of powered drive, the correction coefficient X1 (<1) is set only in the case of regeneration, and thus the control with higher accuracy can be realized.

For example, in the case in which an elastic load using the restoring force of compressed air is considered as the motor load 12, when a slide descends on compressed air to store energy in the load and then the slide rises, the amount of the regenerative energy differs depending on the ascending velocity. This is because the material surrounding the compressed air also causes restoring time, and if the slide separates first, a regeneration state is not obtained because the motor loses the reaction force from the elastic load. In practice, regenerative energy is generated because the slide does not separate from the material surrounding the compressed air. However, the amount of the power energy when the slide descends and the amount of the regenerative energy when the slide rises do not become equal to each other, and the amount of the energy on the regeneration side becomes lower. In this case, the amount of the energy stored on the load side when operation of the motor is started is computed every moment, the amount corresponding thereto is subtracted from the energy stored in the storage device, and a state in which the amount does not return to the specified amount of energy upon regeneration occurs. Therefore, in this case, in accordance with the amount of the energy in regeneration, the energy in powered drive is multiplied by a correction coefficient (weight coefficient) X2 (≠1). For example, at the start of the operation, (the amount of energy stored on the load side)×(correction coefficient X2) is carried out to correct the amount of the energy stored in the storage device 6 and the corresponding amount is subtracted, and in regeneration, (the amount of regenerated energy)×(correction coefficient X2) (here, X2=1) is carried out to return the amount directly as the energy amount, whereby the subtracted amount is returned to the original value.

When the correction coefficient X1 (in regeneration: X1<1, in powered drive: X1=1) in regeneration and the correction coefficient X2 (in powered drive: X2≠1, in regeneration: X2=1) are assembled as a correction coefficient X, the correction coefficient X is expressed by (Equation 18).

[Mathematical Expression 18]

$$X=X1 \cdot X2 \qquad \text{(Equation 18)}$$

Herein, the appropriate voltage Vref of the storage device 6 (electrolytic capacitor) in the case of the elastic load expressed by (Equation 10) described above and the appropriate voltage Vref of the storage device 6 (electrolytic capacitor) in the case of the gravity load expressed by (Equation 17) described above are expressed by (Equation 19) and (Equation 20) by using the correction coefficient X of (Equation 18), respectively.

[Mathematical Expression 19]

$$Vref=\sqrt{k\{Emax-(X \cdot E\alpha+X \cdot Ed)\}} \quad \text{(Equation 19)}$$

[Mathematical Expression 20]

$$Vref=\sqrt{k\{Emax-(X \cdot E\alpha+X \cdot Ew)\}} \quad \text{(Equation 20)}$$

In (Equation 18) described above, the correction coefficient X2 that can be X2≠1 in powered drive and X2=1 in regeneration is set. However, the correction coefficient X2 that can be X2≠1 in regeneration and X2=1 in powered drive may be set.

As described above, in the cases of the elastic load and the gravity load, inertial load is generated in common in both of the loads. Therefore, regarding the appropriate voltage Vref of the storage device 6, the amount of the energy stored in the inertial load and the load side (elastic load or gravity load) is computed by (Equation 19) and (Equation 20) described above in advance at every moment from the beginning of operation of the motor, the amount corresponding thereto is subtracted from the amount of the energy stored in the storage device 6, and the DC voltage of the storage device 6 may be variably controlled so that the specified amount of energy is restored when regeneration is carried out.

<<Examples of Inertial Load, Elastic Load, and Gravity Load>>

Next, the inertial load, the elastic load, the gravity load, and others will be described in detail with specific examples.

Figure 2:
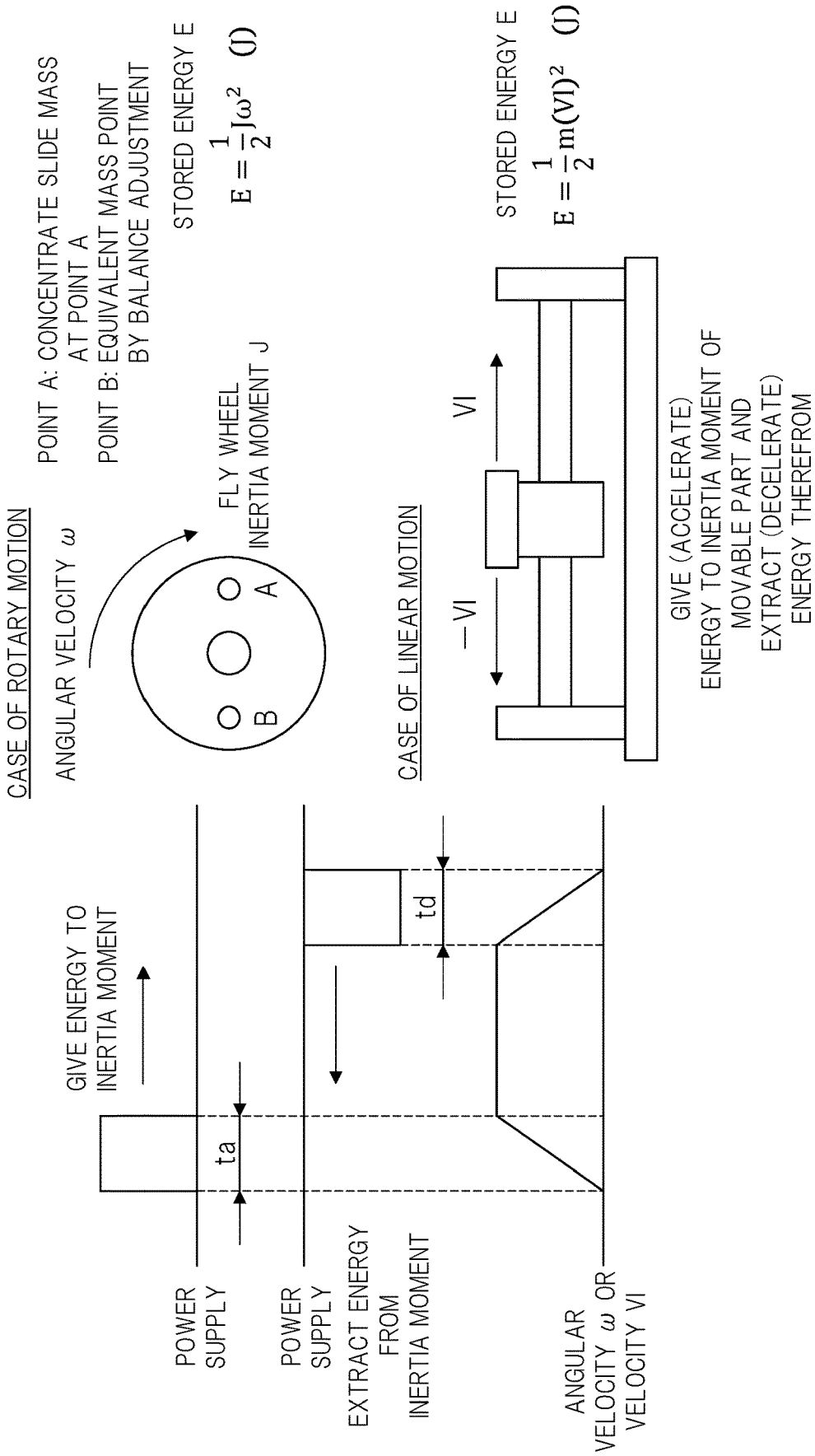
FIG. 2 is a diagram for describing rotational or kinetic energy stored in inertial load.

FIG. 2 is a diagram for describing rotational or kinetic energy stored in inertial load.

As illustrated in FIG. 2, when electric energy is given to an inertial body for time to by a motor or the like, rotational energy rotating at an angular velocity ω is given to the inertial body. Herein, if losses due to electric paths, rolling friction, windage loss, etc. are ignored, the inertial body permanently keeps rotating even when supply of electric energy is stopped. However, since the losses cannot be ignored in practice, the energy corresponding to the loss has to be kept being given as electric energy in order to maintain the rotation of the inertial body. Next, when the rotational energy is removed by applying regenerative brake to the inertial body for time td, the inertial body stops, and the rotational energy is regenerated and is returned to the power supply as electric energy. In other words, rotating the inertial load means converting the electric energy supplied from the power supply into rotational energy, and stopping the inertial load by regenerative brake means changing the rotational energy into electric energy again, and it can be said that these are the actions of transferring the locations to store the energy.

FIG. 2 illustrates a rotary motion of a crank shaft of a crank press machine as an example of rotary motions, and a rotary motion of a flywheel in which a slide mass is represented at a point A in a concentrated manner and a mass point equivalently showing a balance mass by balance adjustment is represented by a point B is schematically illustrated. The energy E stored in such an inertial body is expressed by (Equation 21) when the angular velocity of the crank shaft is ω (rad/s) and the inertia moment of the inertial body is J (kg·m^2), and it can be understood that the energy E is proportional to the inertia moment J and is proportional to the square of the angular velocity ω.

[Mathematical Expression 21]

$$E = \frac{1}{2} \cdot J \cdot \omega^2 (J) \quad \text{(Equation 21)}$$

Also, as illustrated on the lower side of FIG. 2, in the case of linear motion, the energy E stored as kinetic energy is expressed by (Equation 22) when the mass of the inertial body is m (kg) and the moving velocity is V1, and it can be understood that the energy E is proportional to the mass m and is proportional to the square of the moving velocity V1 (m/s).

[Mathematical Expression 22]

$$E = \frac{1}{2} \cdot m \cdot (V1)^2 (J) \quad \text{(Equation 22)}$$

FIG. 3 is a diagram for schematically describing a structure of a press machine equipped with a pneumatic die cushion.

In FIG. 3, the press machine includes a slide 25 configured to ascend and descend and a fixed bolster 27. The slide 25 ascends and descends by the rotation of a slide motor 20 through a slide driver 21 and a crank mechanism (a crank shaft 22, a crank eccentric part 23) while being guided by a slide gib 26. The bolster 27 is fixed on a bed 28, is coupled to a slide mechanism through a frame of the press machine, and is configured to receive pressurizing force from above. In a case of a crank press which is most used as an example of the slide driver 21, the rotation of the slide motor 20 is transmitted from the crank shaft 22 to the crank eccentric part 23, and the slide 25 is moved upward/downward via a connection rod 24. Dies are attached to this press machine to carry out press work. An upper die 29 is set on a lower surface of the slide 25, a lower die 30 is set on an upper surface of the bolster 27, and a pair of the upper and lower dies constitutes one die. The die can subject an iron plate to processing such as shearing, bending, and drawing and can cause the iron plate to undergo plastic deformation to create an intended shape. The quality and performance of this die has an important role related to the productivity and quality of press work. In drawing work, for example, in cup drawing, a compressive stress in a circumferential direction is generated on a flange part of a molded product as the processing progresses, and crumpling generates if the stress is left untreated. A device which generates a necessary crumpling-suppressing pressure from the lower side so that the crumpling does not occur is the pneumatic die cushion device 31. The pneumatic die cushion device 31 is built in the bed 28, and the lower die 30, a die cushion pad (not illustrated), and a die cushion pin (not illustrated) operate in conjunction with each other. As the die cushion device, a servo die cushion using a servo motor can be presented other than the pneumatic type and hydraulic type.

FIG. 4 is a diagram for describing the energy stored in a pneumatic die cushion.

As illustrated in FIG. 4, the die cushion is a pressure retaining device configured to generate a reaction force for holding the crumpling in drawing work and an upthrust force of a molding object. The pneumatic die cushion can be equivalently replaced by an air spring. When a spring deforms, energy is stored in the spring in a form of elastic energy. It is possible to make the spring do the mechanical work by releasing the stored energy. The air spring which is a material that generates a restoring force of air is also one type thereof, and is used in a pneumatic die cushion.

When energy is to be stored in the pneumatic die cushion device 31, the air in the pneumatic die cushion is compressed by downward movement of the slide 25, elastic energy is stored in this part, and a reaction force is generated toward the slide at the same time. Since the reaction force 31E becomes larger as the air is more pressed downward by the slide 25, it is conceivable to replace the air spring by a spring having a spring constant k (N/m), and the stored elastic energy E can be given by (Equation 23) when displacement caused when pressed by the slide 25 is x (m).

[Mathematical Expression 23]

$$E = \frac{1}{2} \cdot k \cdot x^2 (J) \quad \text{(Equation 23)}$$

Figure 5:
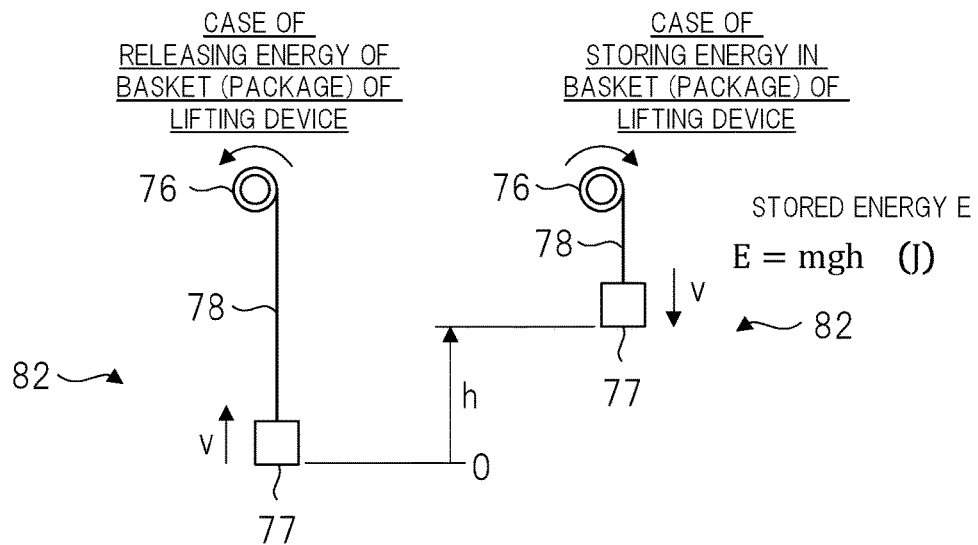
FIG. 5 is a diagram for describing the energy stored in a lifting device.

FIG. 5 is a diagram for describing the energy stored in a lifting device.

As illustrated in FIG. 5, in a lifting device 82, a hoist 76 is coupled to a motor output shaft, and a package (or a basket containing a package) 77 suspended at an end of a rope 78 is lifted up and down. In FIG. 5, when the package 77 having a mass m (kg) is on the ground, energy is in a released state. When the package 77 is hoisted from this state to a height h (m), potential energy mgh (J) is stored. When the package 77 ascends, the motor operates in a powered drive state because the package 77 moves in the opposite direction of the direction of the gravity which works on the package 77, and potential energy is stored in the package 77. Also, when the package 77 descends, the motor operates in a regenerative state because the package 77 descends while restricting the fall by gravity of the package 77, and the potential energy stored in the package 77 is released.

Figure 6:
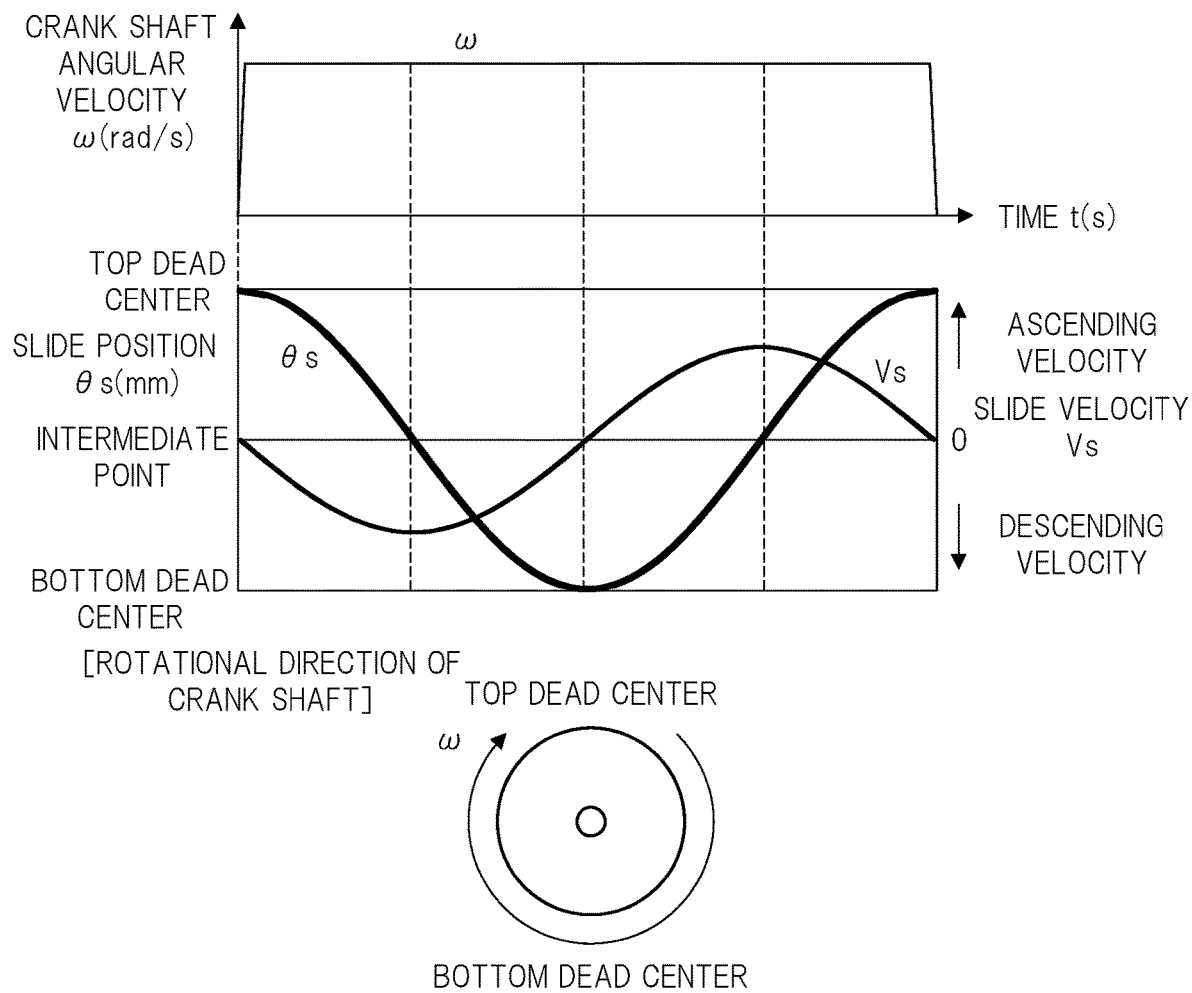
FIG. 6 is a diagram for describing a relationship between a crank shaft angular velocity and a slide velocity of a crank press machine.

FIG. 6 is a diagram for describing a relationship between a crank shaft angular velocity and a slide velocity of the crank press machine.

FIG. 6 illustrates a case in which the crank shaft is rotated in a rotational direction from a top dead center to the top dead center via a bottom dead center by 360 degrees (one rotation). In FIG. 6, the horizontal axis represents time t (s) and the vertical axis represents a crank shaft angular velocity $\omega$ (rad/s), a slide position s (mm), and a slide velocity Vs (m/s). The slide velocity Vs becomes a zero velocity when the slide position is at an intermediate point, a positive side of the slide velocity represents an ascending velocity, and a negative side represents a descending velocity. In FIG. 6, the slide position forms a cosine curve, while the slide velocity forms a sine curve with a 180-degree phase lag because the connecting point of the connecting rod of the crank shaft rotates.

<<Motor Characteristics NT>>

Figure 7:
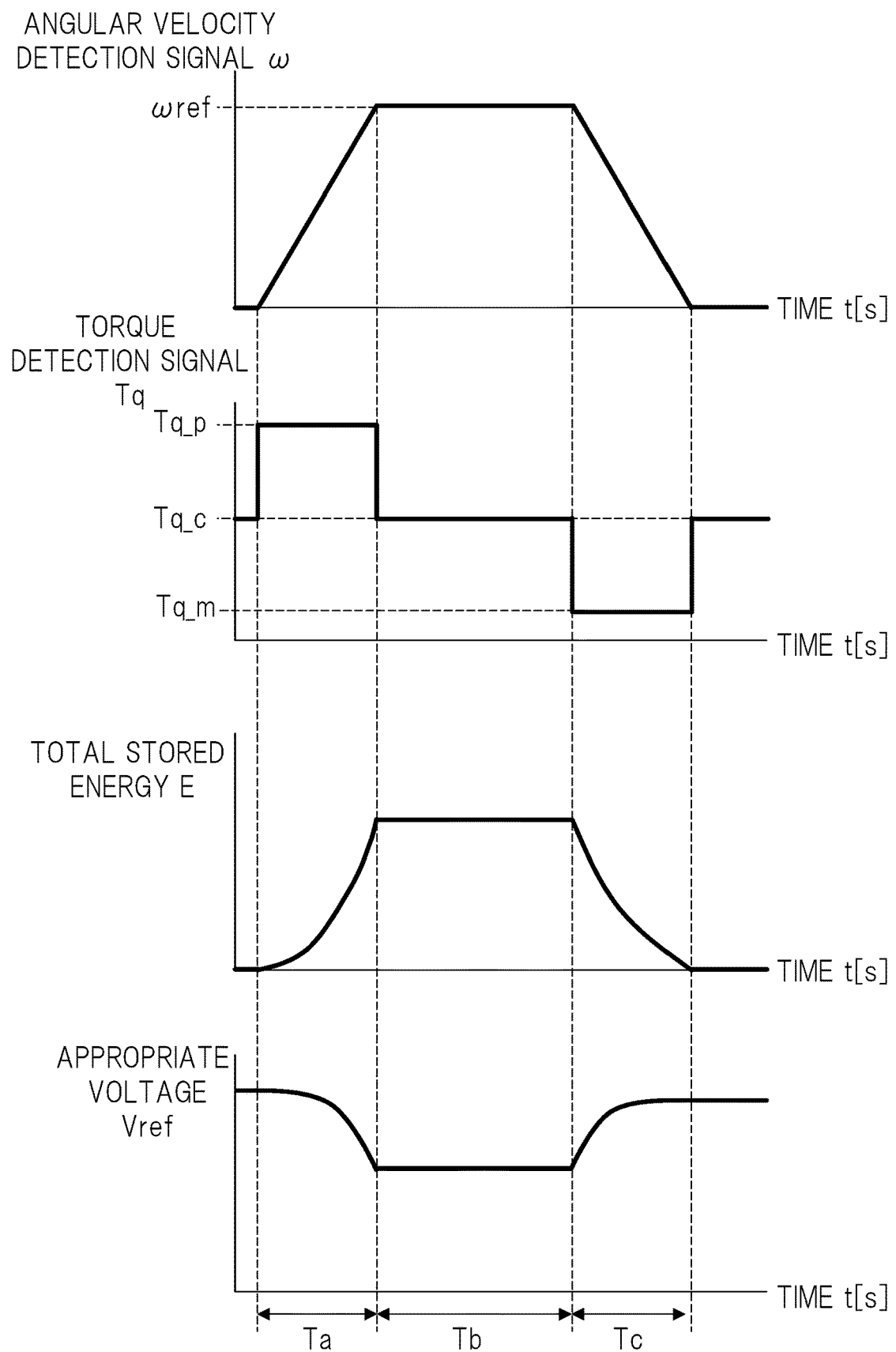
FIG. 7 is a diagram illustrating waveforms of an angular velocity detection signal, a torque detection signal, a total stored energy, and an appropriate voltage in a case in which a motor carries out an acceleration operation, a constant velocity operation, and a deceleration operation.

Next, output changes of the storage device 6 and changes in motor characteristics caused thereby will be described with reference to FIG. 7 and FIG. 8. FIG. 7 is a diagram illustrating waveforms of an angular velocity detection signal $\omega$, a torque detection signal Tq, a total load stored energy (total stored energy) E, and an appropriate voltage Vref in a case in which the motor 3 carries out an acceleration operation, a constant velocity operation, and a deceleration operation. Though described later, the angular velocity detection signal $\omega$ is a detection signal representing an angular velocity of the motor 3, and the torque detection signal Tq is a detection signal representing torque of the motor 3.

Since the motor 3 is accelerated during acceleration time Ta, the angular velocity detection signal $\omega$ rises and reaches a target angular velocity $\omega$ref. Since the motor 3 is at a target angular velocity during constant-velocity time Tb, the angular velocity detection signal $\omega$ becomes constant at the target angular velocity $\omega$ref, and the motor 3 carries out a constant-velocity rotation operation. During deceleration time Tc, the motor 3 decelerates, and the angular velocity detection signal $\omega$ descends.

The torque detection signal Tq represents that acceleration torque Tq_p is applied in order to accelerate the motor during the acceleration time Ta. During the constant-velocity time Tb after the acceleration operation of the motor has been finished, constant-velocity torque Tq_c is applied with respect to friction torque or the like applied to the motor in order to drive at a constant velocity. During the deceleration time Tc, deceleration torque Tq_m for decelerating the motor is applied.

Next, the total stored energy E will be described. Regarding the total stored energy E herein, each of the constant k and the correction coefficient X of (Equation 19) described above is 1, the load energy is only the inertial load stored energy E$\alpha$, and the elastic load stored energy Ed is zero.

The total stored energy E is increased by the inertial load energy in the motor acceleration during the acceleration time Ta according to (Equation 3) and (Equation 5) described above, and the total stored energy E is stored by the amount corresponding to the friction energy with respect to the motor during the constant-velocity time Tb. During the deceleration time Tc, the total stored energy E is lowered because the inertial load stored energy Ea stored by the regenerative operation of the motor in deceleration is returned.

According to the relationship between (Equation 19) described above and the total stored energy E, the appropriate voltage Vref is lowered as the total stored energy E increases, and the appropriate voltage Vref increases as the total stored energy E is lowered. In other words, during the acceleration time Ta, the appropriate voltage Vref is lowered according to the relationship between (Equation 19) described above and the total stored energy E. Since the total stored energy E is not changed during the constant-velocity time Tb, the appropriate voltage Vref is also not changed. During the deceleration time Tc, since the total stored energy E is also reduced along with deceleration of the motor, the appropriate voltage Vref increases according to (Equation 19) described above.

Herein, the inertial load stored energy Ea is increased by the acceleration torque Tq_p during motor acceleration, and the inertial load stored energy Ea is reduced by the acceleration torque Tq_m during motor deceleration, so that the appropriate voltage Vref changes in accordance with (Equation 19) described above. Similarly, the appropriate voltage Vref is lowered or increased in the same manner as the inertial load stored energy E$\alpha$ by the increase or reduction of the elastic load stored energy Ed or the gravity load stored energy Ew.

Figure 8:
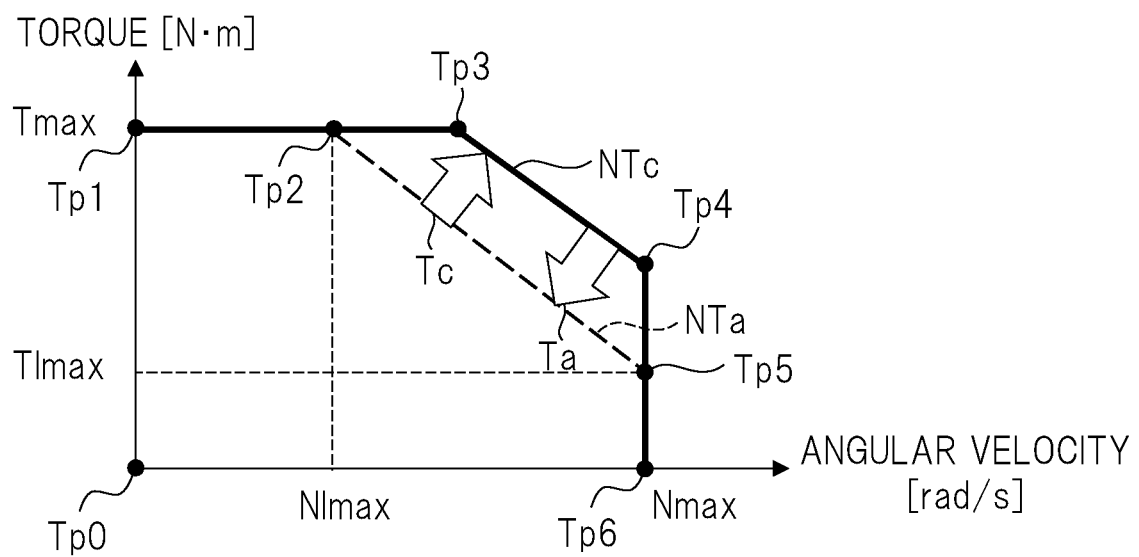
FIG. 8 is a diagram for describing motor characteristics which change in accordance with motor operations.

FIG. 8 is a diagram for describing motor characteristics which change in accordance with the motor operations illustrated in FIG. 7. In FIG. 8, the vertical axis represents the torque T of the motor, and the horizontal axis represents the angular velocity $\omega$ of the motor. In FIG. 8, the maximum value of the torque applied to the motor is illustrated as maximum torque Tmax, and the maximum value of the velocity of the motor is illustrated as a maximum angular velocity Nmax.

In FIG. 8, characteristics NTc illustrated by a bold solid line and a broken line NTa illustrate motor characteristics NT of the motor 3, and the motor characteristics change depending on the amount of electric power supplied to the motor 3.

In this diagram, the motor characteristics NTc illustrate the characteristics in the case in which the appropriate voltage Vref which controls the step-up/down power supply circuit 5 (FIG. 1) is not restricted. Namely, the characteristics in the case in which the velocity of the motor 3 is increased toward the maximum angular velocity Nmax after the torque applied to the motor 3 has been increased and reached the maximum torque Tmax are illustrated. In this case, the motor characteristics NTc illustrate that the motor 3 can output the motor characteristics in the area surrounded by Tp0→Tp1→Tp3→Tp4→Tp6→Tp0. On the other hand, the motor characteristics Nta illustrate the characteristics in the case in which the appropriate voltage Vref is restricted. As illustrated in FIG. 7, the appropriate voltage Vref is restricted during the acceleration time Ta. When the appropriate voltage Vref is restricted, the amount of electric power which can be supplied to the motor 3 is restricted, and the characteristics of the motor 3 are lowered from the motor characteristics NTc to the restricted motor characteristics Nta in the direction illustrated by an arrow Ta.

When the motor characteristics are lowered to the motor characteristics NTa, the area of the characteristics which can be output by the motor 3 becomes the area of a range Tp0→Tp1→Tp2→Tp5→Tp6→Tp0. In the state of the motor characteristics NTa, when the torque T is the maximum torque Tmax, a lowered velocity N1max is the maximum angular velocity of the angular velocity $\omega$. Also, when the angular velocity $\omega$ is Nmax which is the maximum angular velocity of an unrestricted case, the lowered torque T1Max is the maximum torque of the torque T. Namely, in the case of the restriction, even if the angular velocity $\omega$ is increased after the torque T of the motor 3 reaches the maximum torque Tmax, the attainable maximum angular velocity becomes the lowered velocity N1max, and it is difficult to reach the maximum angular velocity Nmax. Meanwhile, if the angular velocity $\omega$ is caused to be the maximum angular velocity Nmax in the state of the restriction, the attainable maximum torque is the lowered torque T1max, and it is difficult to reach the maximum torque Tmax.

Also, as illustrated in FIG. 7, during the deceleration period Tc, the restriction on the appropriate voltage Vref is reduced. Since the restriction is reduced, the characteristics of the motor 3 move in the direction illustrated by an arrow TC and move toward the motor characteristics NTc so as to restore the characteristics.

Namely, the motor characteristics NT illustrated in FIG. 8 illustrate that, when the amount of electric power supplied from the storage device 6 to the motor 3 is restricted in accordance with the appropriate voltage Vref, the motor characteristics are lowered. For example, if the appropriate voltage Vref is lowered in a large device, it is difficult to reach the maximum angular velocity Nmax even if the velocity is increased after the motor 3 reaches the maximum torque Tmax.

Figure 9A:
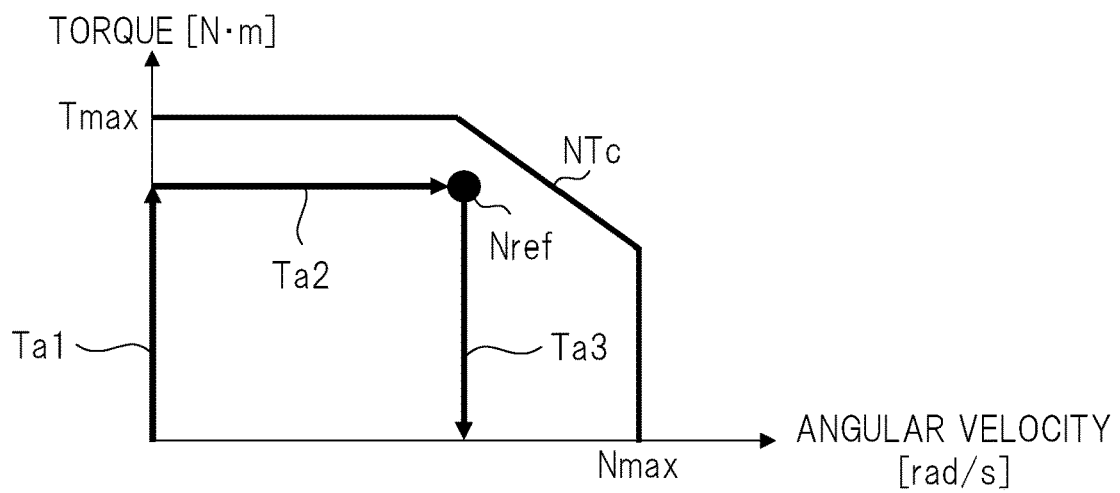
FIG. 9A to FIG. 9C are diagrams for describing the motor characteristics and the motor acceleration operation according to the first embodiment.
Figure 9B:
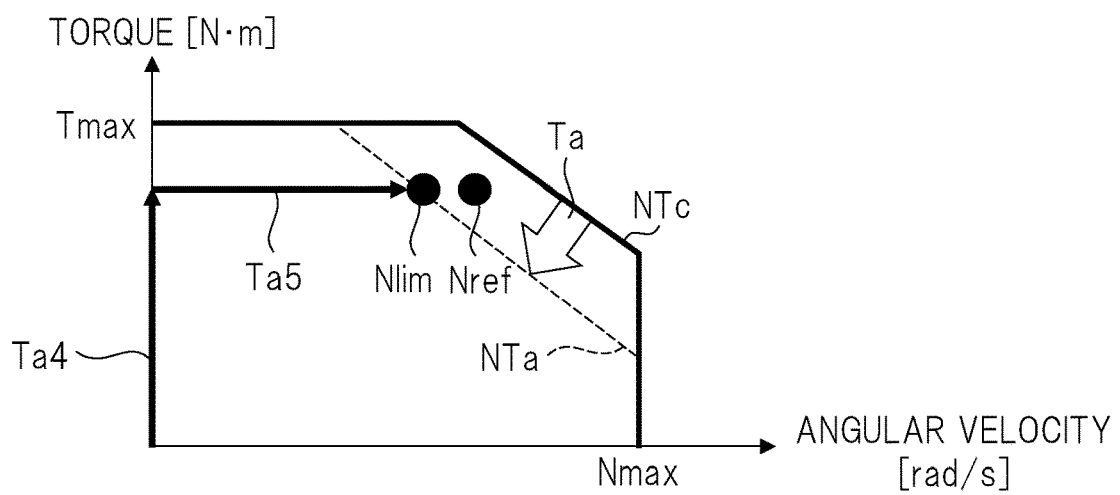

Next, the motor characteristics and motor acceleration operation will be described with reference to drawings. FIG. 9 is a diagram for describing the motor characteristics and the motor acceleration operation according to the first embodiment. Herein, FIG. 9(A) illustrates the motor characteristics and the motor velocity in a case in which the appropriate voltage Vref is not restricted, and FIG. 9(B) illustrates the motor characteristics and the motor velocity in a case in which the appropriate voltage Vref is restricted. In the case in which the appropriate voltage Vref is not restricted, the characteristics of the motor 3 are within the area of the motor characteristics NTc as described in FIG. 8. On the other hand, in the case in which the appropriate voltage Vref is restricted, the characteristics of the motor 3 are within the area of the motor characteristics NTa as described in FIG. 8.

First, with reference to FIG. 9(A), changes in the torque and the angular velocity $\omega$ during motor acceleration until the motor 3 reaches a target velocity Nref without restricting the appropriate voltage Vref will be described. In an acceleration torque application zone Ta1, a motor current is caused to flow to the motor 3 to drive the motor 3 and generate acceleration torque. In a velocity increase zone Ta2, the acceleration torque generated in the acceleration torque application zone Ta1 generates angular acceleration in the motor 3 in accordance with (Equation 1) described above. The angular velocity $\omega$ of the motor 3 increases in accordance with the generated angular acceleration and reaches the target velocity Nref. After the angular velocity $\omega$ reaches the target velocity, the acceleration torque is reduced in an acceleration torque reduction zone Ta3, and the acceleration operation of the motor 3 is finished.

In the case in which the appropriate voltage Vref is not restricted, the characteristics of the motor 3 are changed within the range of the motor characteristics NTc. Since the target velocity Nref at desired torque is within the range of the motor characteristics NTc as illustrated in FIG. 9(A), the motor 3 can reach the target velocity Nref when the appropriate voltage Vref is not restricted.

Next, the case in which the appropriate voltage Vref is restricted will be described with reference to FIG. 9(B). In FIG. 9(B), NTc represents the motor characteristics of the case without restriction described in FIG. 8 and FIG. 9(A), and NTa represents the motor characteristics of the case with restriction described in FIG. 8. An acceleration torque application zone Ta4 is the same as the acceleration torque application zone Ta1, and a velocity increase zone Ta5 is the same as the velocity increase zone Ta2. In the velocity increase zone Ta5, the angular velocity $\omega$ increases in accordance with (Equation 1) described above as in the velocity increase zone Ta2. However, since the appropriate voltage Vref is restricted, the characteristics of the motor 3 are within the range of the restricted motor characteristics NTa, and the velocity of the motor 3 only reaches the angular velocity of a velocity limit value Nlim without reaching the target velocity Nref. Namely, since the target velocity Nref is exceeding the range of the motor characteristics NTa, the angular velocity $\omega$ of the motor 3 only reaches the velocity limit value Nlim, which is on the line of the motor characteristics NTa, without reaching the target velocity Nref. Note that FIG. 9(B) omits the zone corresponding to the acceleration torque reduction zone Ta3.

As illustrated in FIG. 7 to FIG. 9(B), when the characteristics of the motor 3 are lowered to the motor characteristics NTa due to the restriction on the appropriate voltage Vref, a situation that the angular velocity $\omega$ of the motor does not reach the target velocity Nref occurs.

In the first embodiment, an operation of temporarily restoring the motor characteristics is carried out. More specifically, in the first embodiment, in the case in which the appropriate voltage Vref is restricted when the velocity of the motor 3 is to be driven to the target velocity, an operation of temporarily increasing (raising) the appropriate voltage Vref to temporarily restore the motor characteristics is carried out. Since the motor characteristics are temporarily moved toward the motor characteristics NTc when the motor characteristics are the motor characteristics NTa due to the restriction, the motor 3 can reach the target velocity Nref.

In order to temporarily increase the appropriate voltage Vref, in the first embodiment, a voltage assist amount Vast is temporarily added to the appropriate voltage Vref.

The appropriate voltage Vref in the case in which the voltage assist amount Vast is added is expressed by (Equation 24) and (Equation 25). Herein, (Equation 24) is an equation in which the voltage assist amount is added to (Equation 19) described above, and (Equation 25) is an equation in which the voltage assist amount is added to (Equation 20) described above. The voltage assist amount Vast can be changed by an instruction of the appropriate voltage at arbitrary timing regardless of the drive state of the motor 3.

[Mathematical Expression 24]

$$Vref = \sqrt{k\{Emax - (X \cdot E\alpha + X \cdot Ed)\}} + Vast \quad \text{(Equation 24)}$$

[Mathematical Expression 25]

$$Vref = \sqrt{k\{Emax - (X \cdot E\alpha + X \cdot Ew)\}} + Vast \quad \text{(Equation 25)}$$

Figure 9C:
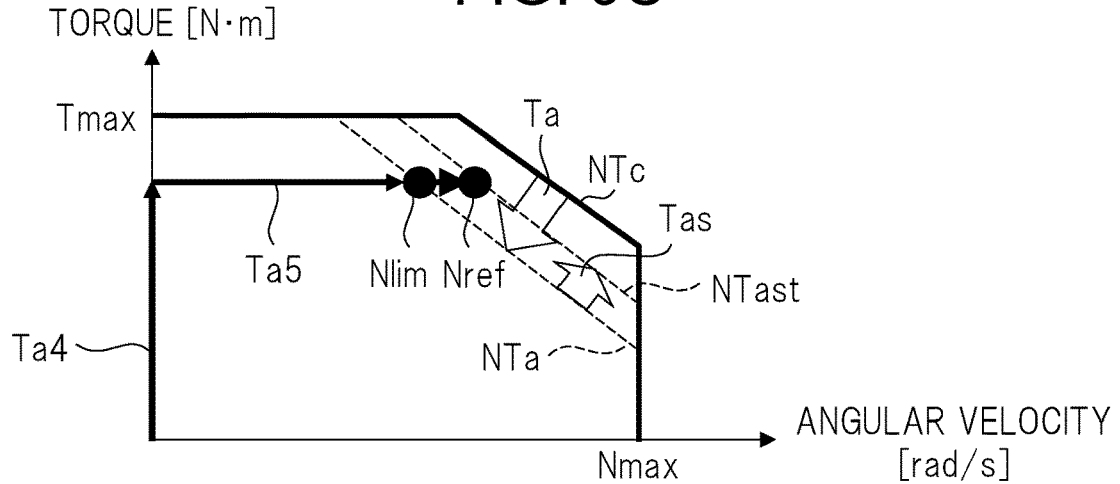

FIG. 9(C) is a diagram for describing a motor operation in the case in which the voltage assist amount Vast is added when the motor does not reach the target velocity Nref due to the restriction on the appropriate voltage Vref. FIG. 9(C) is similar to FIG. 9(B). The difference is that the voltage assist amount Vast is added to the appropriate voltage Vref and the appropriate voltage is increased in the velocity increase zone Ta5.

More specifically, with the velocity limit value Nlim, the angular velocity ω does not reach the target velocity Nref. Therefore, the voltage assist amount Vast increases in the velocity increase zone Ta5, and the appropriate voltage Vref increases. Since the appropriate voltage Vref increases, the characteristics of the motor 3 move in the direction of an arrow Tas and move from the motor characteristics NTa to restored motor characteristics NTast, and the motor characteristics are restored. As a result, the angular velocity ω of the motor 3 can reach the target velocity Nref.

Patent Document 1 describes a low-cost, low-loss, and high-density power supply device achieved by variably setting the control command values of the storage device based on the inertial load such as rotational energy accumulated in the motor or the motor load or spring energy and the elastic load which generates reaction force. The technique described in Patent Document 1 is particularly effective for a power supply device which variably controls the voltage of the storage device targeted for the energy stored in inertial load.

However, there has been a problem that the amount of electric power supplied to the motor is reduced by restricting the control command value for the storage device and motor characteristics cannot be fully exerted in some cases. On the other hand, according to the first embodiment, even in a state in which the control command value (appropriate voltage Vref) for the storage device is restricted depending on motor drive, if the motor requires a large amount of electric power, the control command value (appropriate voltage Vref) for the storage device is temporarily increased, thereby making it possible to operate without impairing the motor characteristics.

More specifically, in the cases in which the load of the motor 3 is inertial load, elastic load, or gravity load, energy is stored on the load side simultaneously with the operation of the motor 3. In the first embodiment, the velocity and the current of the motor 3 are detected together with the operation of the motor 3 by detector (encoder and current detector), and the amount of energy E stored on the load side is calculated. When the appropriate amount of the energy stored in the storage device 6 is assumed to be Eref and the energy of the fully-charged storage device 6 is assumed to be Emax, the energy stored in the storage device 6 can be optimized by calculating the appropriate energy stored in the storage device 6 as Eref=(Emax−E). Furthermore, if energy is temporarily required depending on the motor load, the motor characteristics can be fully exerted by carrying out the control so as to supply energy to the storage device 6, and it is possible to realize the downsizing, high efficiency, and cost reduction of the power conversion system.

<Specific Example of Power Conversion System and Motor Control Method>

Next, a specific example of the power conversion system according to the first embodiment and the motor control method based on the same will be described with reference to drawings.

Figure 10:
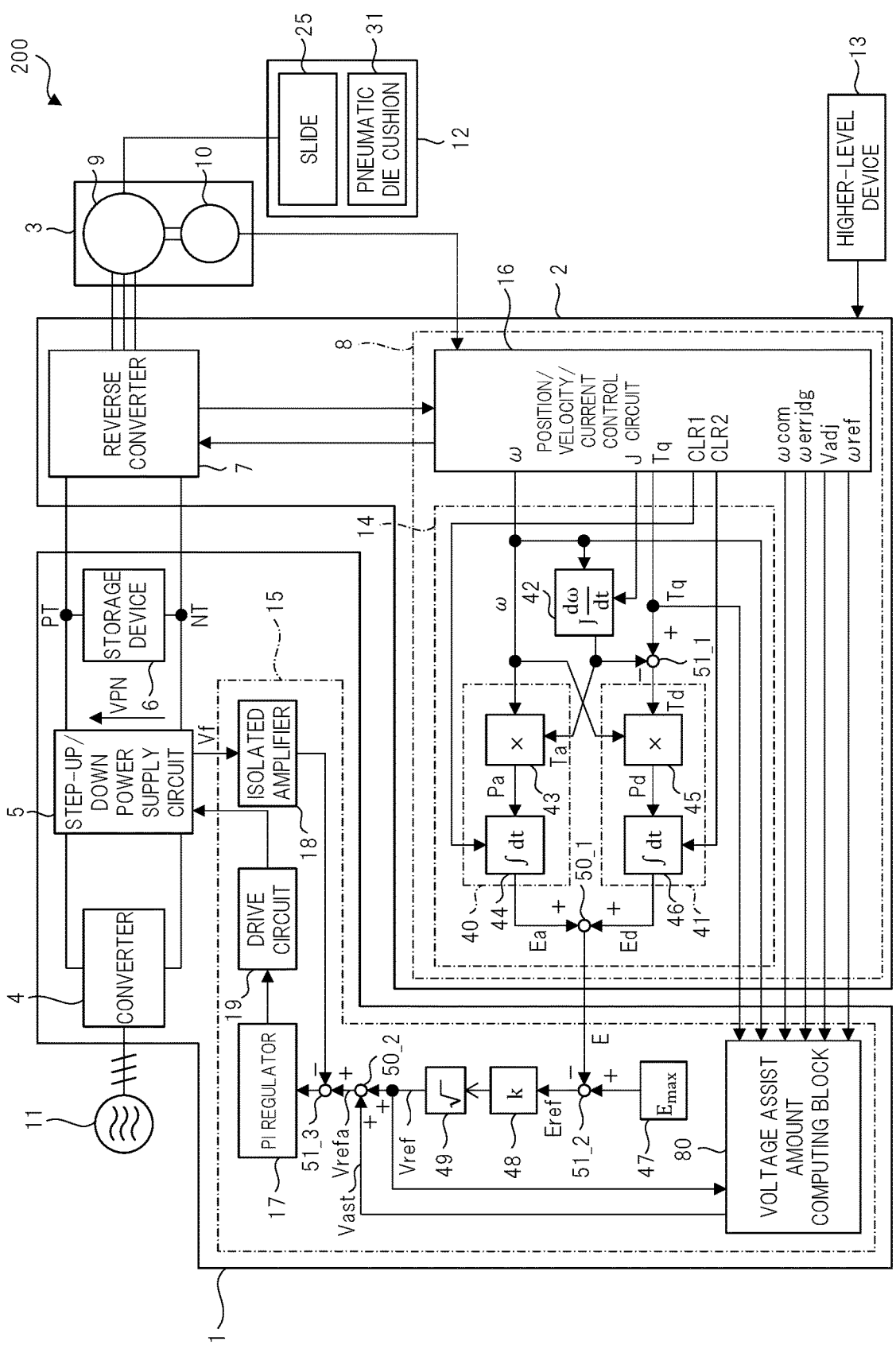
FIG. 10 is a block diagram illustrating a specific example of the power conversion system according to the first embodiment.

FIG. 10 is a block diagram illustrating a specific example of the power conversion system according to the first embodiment. The power conversion system 200 is used in a case in which a press machine equipped with pneumatic die cushion (hereinafter, referred to also as a press machine) is driven as load by a motor. Namely, the motor load 12 is composed of a press machine. Since the press machine has already been described with reference to FIG. 3 and FIG. 4, the description thereof will be omitted herein. Note that FIG. 10 illustrates only the slide 25 and the pneumatic die cushion 31 provided in the press machine as the motor load 12.

FIG. 10 is similar to FIG. 1. The motor 3, the converter 4, the step-up/down power supply circuit 5, the storage device 6, the reverse converter 7, the AC motor 9, the encoder 10, the power supply 11, and the higher-level device 13 illustrated in FIG. 10 have already been described in FIG. 1, and the descriptions thereof will be omitted unless otherwise required. A major difference from FIG. 1 is that FIG. 10 illustrates the configuration of the voltage command computing circuit 15 in the power supply device 1 and the configuration of the control circuit 8 in the power conversion device (motor power conversion device) 2 in more detail.

As described in FIG. 1, the power supply device 1 includes the converter 4, the step-up/down power supply circuit 5, the storage device 6, and the voltage command computing circuit 15, which controls the DC voltage VPN by controlling the operations of the step-up/down power supply circuit 5. Also, the power conversion device 2 includes the reverse converter 7 and the control circuit 8, controls the operations of the motor 3 by converting the electric power supplied to the power supply device 1 and supplying it to the motor 3, and further supplies the electric power generated by the regenerative operations of the motor 3 to the storage device 6 of the power supply device 1.

The control circuit 8 controls the operations of the reverse converter 7 and calculates the stored energy, which is the energy accumulated in the motor 3 and the motor load (press machine) 12 driven by the motor 3, based on the angular velocity of the motor 3 obtained via the encoder 10 provided in the motor 3, the torque of the motor 3 computed based on the current values detected by current detectors 59 and 60 which will be described later and provided in the reverse converter 7, and the inertia moment related to the motor 3 set in advance.

More specifically, the control circuit 8 includes a position/velocity/current control circuit 16, which generates gate signals based on detection results from the current detectors 59 and 60, the encoder 10, and the like, controls the drive of the motor 3 by controlling the reverse converter 7 with the gate signals, and computes the angular velocity, torque, and the like of the motor 3, and a stored energy computing circuit (computing circuit) 14, which calculates the stored energy of the press machine which is the motor load 12 based on the computation results of the position/velocity/current control circuit 16.

The voltage command computing circuit 15 described above controls the step-up/down power supply circuit 5 based on the stored energy calculated by the control circuit 8 and a maximum amount of electric power determined in advance as a maximum value of the amount of electric power allowed to be stored in the storage device 6, thereby controlling the amount of electric power stored in the storage device 6 from the power supply 11.

The motor 3 which drives the slide 25 of the motor load (press machine) 12 is composed of the AC motor 9 and the encoder 10 provided for the AC motor 9. The velocity, position, and magnetic-pole position of the AC motor 9 are detected by the encoder 10 and are fed back to the position/velocity/current control circuit 16 of the control circuit 8 of the power conversion device 2 as the information of the motor 3.

Also, motor drive commands are supplied from the higher-level device 13 to the position/velocity/current control circuit 16. The position/velocity/current control circuit 16 subjects the information (velocity, position, magnetic-pole position), which has been fed back from the encoder 10, and the motor drive command from the higher-level device 13 to comparison operation, thereby generating PWM signals and outputting the generated PWM signals to the reverse converter 7 such that the slide 25 of the press machine driven by the motor 3 follows the motor drive commands.

The reverse converter 7 receives an input of a DC voltage (P-N voltage) supplied from the power supply device 1, converts the DC voltage to an AC variable voltage and variable current, and drives the AC motor 9 with the converted variable voltage and variable current, thereby controlling the position, velocity, and current of the motor. Note that the current of the AC motor 9 is detected by the current detectors 59 and 60 (described later) provided in the reverse converter 7, and is fed back to the position/velocity/current control circuit 16 to be used for computation of torque and the like.

The power supply device 1 receives an input of the AC power from the power supply 11, converts the AC to DC voltage by the converter 4, and inputs the DC voltage to the step-up/down power supply circuit 5. The step-up/down power supply circuit 5 applies a variable DC voltage to the reverse converter 7 by increasing, reducing, or both increasing and reducing the DC voltage. The step-up/down power supply circuit 5 is controlled by the voltage command computing circuit 15.

The voltage command computing circuit 15 receives an input of the total stored energy E, which has been formed by the computation in the control circuit 8 of the power conversion device 2, and subjects the step-up/down power supply circuit 5 to variable voltage control such that the DC voltage VPN of the storage device 6 becomes an appropriate voltage. Also, the storage device 6 is installed between the step-up/down power supply circuit 5 and the reverse converter 7 and stores the electric energy supplied from the power supply 11 and the regenerative energy supplied from the press machine via the motor 3, the reverse converter 7, and the like.

<<Outlines of Control in Power Conversion System>>

Outlines of the overall control of the power conversion system 200 will be described.

First, the energy stored in the inertial load of the press machine, which is the motor load 12, will be described. When a motor drive command is given from the higher-level device 13, the power conversion device 2 starts the operation of the motor 3 in accordance with the motor drive command and starts ascending/descending operations of the slide 25 in accordance with the command. When the slide 25 starts the ascending/descending operation, the power conversion device 2 computes, in real time, the amount of the stored energy of the inertial load stored in the motor 3 and the inertia moment including a mechanism part coupled to the load thereof. Also, when the slide 25 and the pneumatic die cushion device 31 both start the ascending/descending operation, the power conversion device 2 computes, in real time, the amount of the stored energy of the inertial load stored in the inertia moment including also the pneumatic die cushion device 31.

Even if the regenerative energy returns when regenerative stop is to be carried out next time, overflow of the storage capacity of the storage device 6 has to be prevented. Therefore, the capacity of the energy stored in the storage device 6 is controlled at the same time with the start of the operation so as to lower the capacity in advance. When a regeneration stop command is issued as a motor drive command from the higher-level device 13 in the state controlled in this manner, since the energy level returns to the original energy state level before the start of operation even when the regenerative energy actually returns, the storage device 6 does not become an overcharged state.

The computation of the stored energy described above is carried out by the stored energy computing circuit 14 in the control circuit 8 of the power conversion device 2, and the optimum value of the energy capacity of the storage device 6 is controlled by the voltage command computing circuit 15 of the power supply device 1 with the P-N voltage command (appropriate voltage) Vref replaced by the voltage of the storage device 6.

<<<Stored Energy Computing Circuit and Voltage Command Computing Circuit>>>

Next, the operations of the stored energy computing circuit 14 in the power conversion device 2 and the voltage command computing circuit 15 in the power supply device 1 will be described.

The signals input from the position/velocity/current control circuit 16 to the stored energy computing circuit 14 are the angular velocity detection signal $\omega$ and the torque detection signal Tq detected by the encoder 10, the inertia moment J, and integral clear signals CLR1 and CLR2.

First, the energy stored in the inertial load will be described. The angular velocity detection signal $\omega$ and the inertia moment J of the motor 3 are input to an acceleration/deceleration torque computing circuit 42, and the acceleration/deceleration torque computing circuit 42 calculates the acceleration/deceleration torque T$\alpha$ based on them. The output Ta and the angular velocity detection signal $\omega$ of the acceleration/deceleration torque computing circuit 42 are computed by an acceleration/deceleration power computing circuit 43, and acceleration/deceleration power P$\alpha$ is output from the acceleration/deceleration power computing circuit 43. The acceleration/deceleration power Pα is subjected to time integration computation in an inertial load stored energy computing circuit 44 and is output as inertial load stored energy Eα. Note that it is possible to consider an inertial load stored energy computing block 40 as being composed of the acceleration/deceleration power computing circuit 43 and the inertial load stored energy computing circuit 44.

Next, the energy stored in the elastic load will be described. The torque detection signal Tq and the output Tα of the acceleration/deceleration torque computing circuit 42 are computed by an addition/subtraction computing unit 51_1 and is output as the elastic load torque Td from the addition/subtraction computing unit 51_1. The elastic load torque Td and the angular velocity detection signal ω are computed in an elastic load power computing circuit 45 and is output as elastic load power Pd. The elastic load power Pd is subjected to time integration computation in the elastic load stored energy computing circuit 46 and is output as the elastic load stored energy Ed. Note that it is possible to consider an elastic load stored energy computing block 41 as being composed of the elastic load power computing circuit 45 and the elastic load stored energy computing circuit 46.

Note that the integral clear signals CLR1 and CLR2 are also supplied from the position/velocity/current control circuit 16 to the inertial load stored energy computing circuit 44 and the elastic load stored energy computing circuit 46. These integral clear signals CLR1 and CLR2 are signals which clear the output of integral computing circuits, that is, the inertial load stored energy computing circuit 44 and the elastic load stored energy computing circuit 46. Note that the inertia moment J output from the position/velocity/current control circuit 16 to the acceleration/deceleration torque computing circuit 42 is the total of a rotator inertia moment of the AC motor 9 and the inertia moment on the load side of the motor 3 converted in terms of a motor axis.

The output Ea of the inertial load stored energy computing block 40 and the output Ed of the elastic load stored energy computing block 41 are subjected to addition operation in an addition computing unit 50_1, and then output to the voltage command computing circuit 15 of the power supply device 1 as the total stored energy E.

In the voltage command computing circuit 15, a value Emax is set in a full charge energy setting block 47 as fully charged energy of the storage device 6. This value Emax and the total stored energy E are computed by an addition/subtraction computing unit 51_2. As a result, the difference between the total stored energy E output from the stored energy computing circuit 14 of the power conversion device 2 and the value Emax, that is, the appropriate energy Eref stored in the storage device 6 is calculated.

Herein, for example, when the capacitor (electrolytic capacitor) C is used as the storage device 6, the appropriate voltage (voltage command) Vref for the storage device 6 is obtained by multiplying the appropriate energy Eref, which is the output of the addition/subtraction computing unit 51_2, by k=2/C in a proportionality coefficient block 48 and then carrying out square root operation in a square root operation circuit 49.

The appropriate voltage Vref is supplied from the square root operation circuit 49 to a voltage assist amount computing block 80. Furthermore, a velocity command ωcom, the target angular velocity ωref, the angular velocity detection signal ω, the torque detection signal Tq, a velocity deviation difference determination value ωerrjdg, and a lowered appropriate voltage Vadj are supplied thereto from the position/velocity/current control circuit 16. The voltage assist amount computing block 80 outputs a voltage assist amount Vast based on them. The voltage assist amount computing block 80 which outputs the voltage assist amount Vast will be described later with reference to FIG. 15, FIG. 16, etc., and the description thereof will be omitted herein. The appropriate voltage Vref and the voltage assist amount Vast are added by an addition computing unit 50_2, and the addition computing unit 50_2 outputs an appropriate voltage Vrefa.

Also, though described later, the voltage VPN between both ends of the storage device 6 (PT-NT voltage) is divided by a resistor 56 having a resistance value R1 and a resistor 57 having a resistance value R2 connected in series, and is output from the step-up/down power supply circuit 5 as a detection value (feedback voltage) Vf. This feedback voltage Vf is fed back after electric insulation in an isolated amplifier 18. Then, the appropriate voltage Vrefa and the feedback voltage Vf of the storage device 6 are subjected to difference operation of Vrefa-Vf in an addition/subtraction computing unit 51_3. The difference voltage obtained in the addition/subtraction computing unit 51_3 is subjected to proportional integral operation in a PI regulator 17. The output of the PI regulator 17 is supplied to the step-up/down power supply circuit 5 via a drive circuit 19, and the step-up/down power supply circuit 5 is controlled by the PI regulator 17. Namely, the voltage VPN between both ends of the step-up/down power supply circuit 5, that is, the output voltage of the storage device 6 is subjected to feedback control by the PI regulator 17 in accordance with the value of the appropriate voltage Vrefa. Since the voltage between both ends of the step-up/down power supply circuit 5, that is, the voltage of the storage device 6 is instructed in accordance with the appropriate voltage Vrefa, the appropriate voltage Vrefa can be regarded as a voltage command which instructs the voltage value of the storage device 6.

Figure 11:
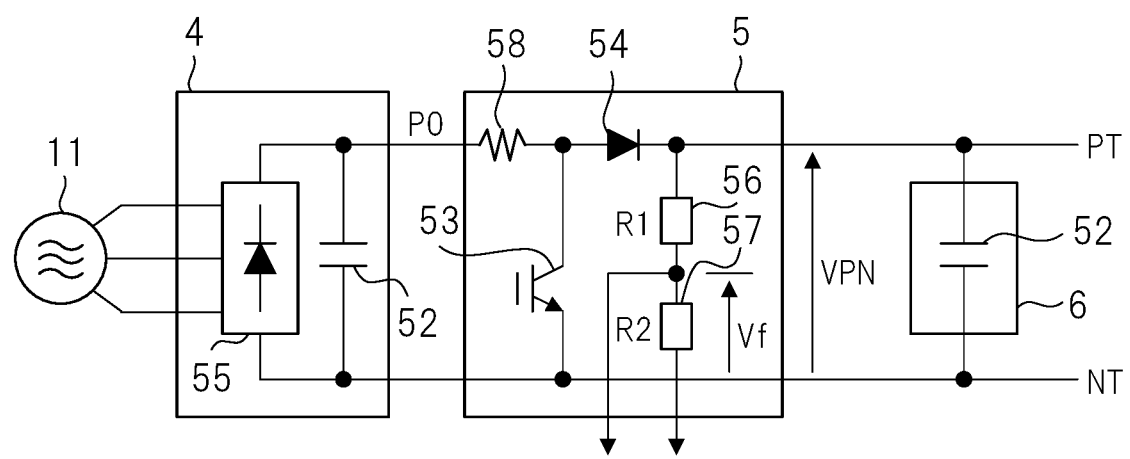
FIG. 11 is a diagram illustrating an example of a converter, a step-up/down power supply circuit, and a storage device of a power supply device according to the first embodiment.

FIG. 11 is a diagram illustrating an example of the converter, the step-up/down power supply circuit, and the storage device of the power supply device according to the first embodiment. In FIG. 11, for example, a circuit which carries out a step-up operation is illustrated as the step-up/down power supply circuit 5. Namely, the step-up/down power supply circuit 5 of FIG. 11 is a step-up power supply circuit.

The converter 4 rectifies a three-phase AC voltage, which is supplied from the power supply 11, by a full-wave rectifier 55 and converts the voltage to an approximately constant DC voltage, which is determined by a received voltage. The converted DC voltage is smoothed by a smoothing capacitor 52. The smoothed DC voltage is supplied to a switching element 53, which repeats ON/OFF, via a step-up reactor 58 in the step-up/down power supply circuit 5 which is a step-up power supply circuit. When the switching element 53 is turned ON, the current flowing to the step-up reactor 58 is increased, and when the switching element is turned OFF next, the current which has been flowing from the step-up reactor 58 to the switching element 53 is switched to the side with a diode 54. As a result, the voltage e=−L·(dI/dt) generated at the both ends of the step-up reactor 58 is added to the DC voltage (PT-NT voltage), and the output voltage VPN is raised. The switching element 53 repeats ON/OFF by the drive circuit 19 illustrated in FIG. 10, and the step-up/down power supply circuit 5 which can variably control the step-up voltage by changing the ON/OFF conductivity ratio thereof is configured.

The smoothing capacitor 52 serving as the storage device 6 is connected to the output of the step-up/down power supply circuit 5, and the electric energy charged from the side of the AC power supply 11 and the regenerative energy regenerated from the load side are stored therein. Note that FIG. 11 illustrates an example using the smoothing capacitor 52 as the storage device 6, but the embodiment is not limited thereto. For example, in order to increase the capacity of the storage device 6, large-capacity electrolytic capacitors connected in parallel to increase the capacity may be used as the storage device 6, or a secondary battery, an electric double layer capacitor, or the like may be used as the storage device 6.

In FIGS. 11, 56 and 57 denote the above-described resistors, and the both-end voltage (output voltage) VPN is divided in accordance with a dividing ratio determined by the ratio of the resistance values R1 and R2 of the resistors 56 and 57 connected in series between the terminals PT and NT and is output as the feedback voltage Vf.

<<<<Modification>>>>

Figure 12:
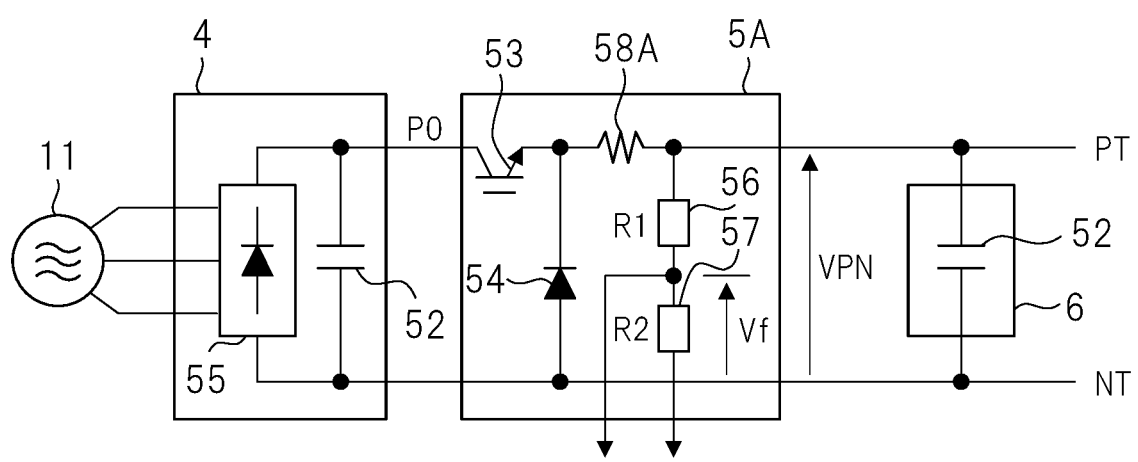
FIG. 12 is a diagram illustrating a modification of the converter, the step-up/down power supply circuit, and the storage device of the power supply device according to the first embodiment.

FIG. 12 is a diagram illustrating a modification of the converter, the step-up/down power supply circuit, and the storage device of the power supply device according to the first embodiment. FIG. 12 illustrates a case in which a circuit which carries out a step-down operation is used as the step-up/down power supply circuit. Namely, a step-up/down power supply circuit 5A of FIG. 12 is a step-down power supply circuit.

The converter 4 rectifies a three-phase AC voltage, which is supplied from the AC power supply 11, by the full-wave rectifier 55 and converts the voltage to an approximately constant DC voltage, which is determined by a received voltage. The converted DC voltage is smoothed by the smoothing capacitor 52. In the modification, the switching element 53, which repeats ON/OFF by the drive circuit 19, is provided at an entrance of the step-up/down power supply circuit 5A. When the switching element 53 is turned ON, since a step-down reactor 58A and the load are connected in series, the DC voltage smoothed in the smoothing capacitor 52 is divided and output from the step-up/down power supply circuit 5A. The step-up/down power supply circuit 5A according to the modification can variably control the step-down voltage by changing the ON/OFF conductivity ratio of the switching element 53. The smoothing capacitor 52 which functions as the storage device 6 is connected to the output of the step-up/down power supply circuit 5A, and the electric energy charged from the side of the AC power supply 11 and the regenerative energy regenerated from the load side are stored therein. The storage device 6 can adopt various configurations as in FIG. 11. Increase in the capacity of the storage device 6 is also the same as that of FIG. 11.

<<<Reverse Converter and Position/Velocity/Current Control Circuit>>>

Figure 13:
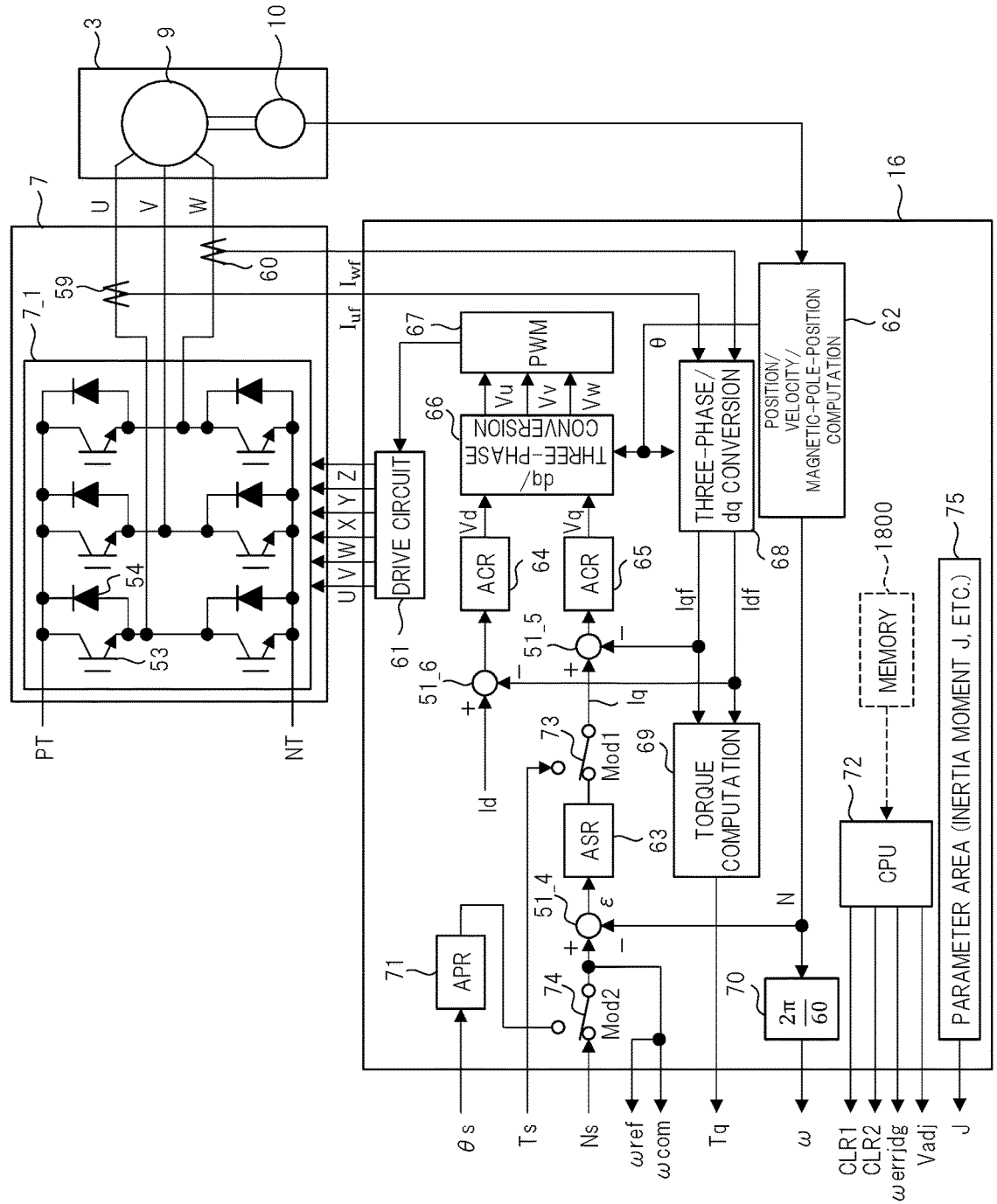
FIG. 13 is a diagram illustrating a configuration of a reverse converter and a position/velocity/current control circuit in a power conversion device according to the first embodiment.

Next, the reverse converter 7 and the position/velocity/current control circuit 16 will be described with reference to the drawings. FIG. 13 is a diagram illustrating a configuration of the reverse converter and the position/velocity/current control circuit in the power conversion device according to the first embodiment. As the power conversion device 2, an AC servo amplifier, a vector control inverter, an inverter, and a DCBL (DC brushless) controller are used, and these are collectively referred to as the power conversion device 2. Though not particularly limited, FIG. 13 illustrates, as an example, the reverse converter 7 included in an inverter and the position/velocity/current control circuit 16 included in a controller.

The reverse converter 7 includes a three-phase inverter 7_1 and the current detectors 59 and 60. The three-phase inverter 7_1 is provided with three arms connected in parallel. In each arm, two sets of inverse-parallel circuits in each of which the switching element 53 and the diode 54 are connected in inverse parallel are provided, and the two sets of inverse-parallel circuits are connected in series between the terminals PT and PN. Note that FIG. 13 illustrates a case in which the three-phase inverter 7_1 is used, but a different multiple-phase inverter may be used. In each arm, intermediate terminals connecting the two sets of inverse-parallel circuits are connected to motor terminals of the AC motor 9 in the motor 3.

A U-phase current detector and a W-phase current detector are connected to two phases (U-phase, W-phase) among three sets of motor terminals (corresponding to U-phase, W-phase, and V-phase), respectively. The U-phase current detector corresponds to the current detector 59, and the W-phase current detector corresponds to the current detector 60. The currents detected by these current detectors 59 and 60 are supplied to the position/velocity/current control circuit 16 as current feedback signals Iuf and Iwf. Note that the U-phase current detector and the W-phase current detector may together be simply referred to as a current detector in some cases.

As the AC motor 9, a permanent magnet motor, an induction motor, a DC brushless motor (DCBL motor), or the like is used. Note that the AC motor 9 is not limited to the permanent magnet motor or the induction motor in which an output shaft is provided at the center of a cylindrical shape and this output shaft is rotated. For example, a linear motor in which one part on a stator side on the circumference of the AC motor 9 is cut open to form a straight line and cause a rotating portion to make linear reciprocal motions may be used. As the AC servo amplifier, the vector control inverter, the inverter, and the DCBL controller which drive the linear motor, those of the AC motor 9 can be used as they are. As the sensor in the case of the linear motor, a linear sensor scale is provided at a fixation part instead of the encoder 10, and a linear sensor head as a moving part is installed on a moving path so as to face it, thereby detecting the position and velocity. Also, the case in which magnetic-pole position detection signals of a magnet are required can be dealt with by attaching a magnetic-pole position detection sensor. Note that the linear motor driven by an AC servo amplifier is referred to also as a linear servo motor. In the following descriptions, the AC motor 9 is assumed to include a linear motor unless otherwise specifically stated.

The output of the encoder 10 attached to the output shaft of the AC motor 9 is input to a position/velocity/magnetic-pole position computing circuit 62 in the position/velocity/current control circuit 16. The position/velocity/magnetic-pole position computing circuit 62 carries out computation based on the output of the encoder 10, the rotation velocity N which is one of the computation results is output for feedback, and a magnetic-pole position signal θ which is another one of the computation results is output to a three phase/dq conversion circuit 68 and a dq/three-phase conversion circuit 66.

The rotation velocity N output from the position/velocity/magnetic-pole position computing circuit 62 is supplied to a computing unit 70. The computing unit 70 calculates the angular velocity detection signal ω based on the rotation velocity N and outputs the calculated signal. Also, the rotation velocity N is supplied as feedback to an addition/subtraction computing unit 51_4.

When a velocity command Ns included in the motor drive command output from the higher-level device 13 is supplied to the addition/subtraction computing unit 51_4 via a mode changing switch (Mod2) 74, the addition/subtraction computing unit 51_4 calculates a deviation E=Ns-N between the rotation velocity N and the velocity command Ns. The calculated deviation ε is amplified in a velocity control circuit (ASR) 63 and is output through a mode changing switch (Mod1) 73 as a torque current command Iq.

The above described mode changing switch (Mod1) 73 switches the torque command Ts to the torque current command Iq when the switch is ON, and switches the position command or the velocity command to the torque current command Iq when the switch is OFF. FIG. 13 illustrates a state in which the above described mode changing switch (Mod1) 73 is OFF. Also, the above described mode changing switch (Mod2) 74 supplies the position command θs, which is output from the APR 71, to the addition/subtraction computing unit 51_4 when the switch is ON, and supplies the velocity command Ns to the addition/subtraction computing unit 51_4 when the switch is OFF. FIG. 13 illustrates a state in which the above described mode changing switch (Mod2) 74 is OFF.

The command output from the mode changing switch (Mod1) 73 can be regarded as a motor drive command. Which mode the motor drive command switches to is instructed to a central processing unit (CPU) 72 in the position/velocity/current control circuit 16 from the higher-level device 13, and the CPU 72 causes the mode changing switch (Mod1) 73 and the mode changing switch (Mod2) 74 to be ON/OFF depending on the instructed mode. The state of the mode changing switch (Mod1) 73 and the mode changing switch (Mod2) 74 illustrated in FIG. 13 illustrates a state in which a mode related to a velocity command is instructed, and a torque current command I1 is output from the mode changing switch (Mod1) 73 as a motor drive command.

Though not particularly limited, the CPU 72 outputs the above described integral clear signals CLR1 and CLR2 and outputs the velocity deviation difference determination value ωerrjdg and the lowered appropriate voltage Vadj. Namely, the CPU 72 controls the overall operations of the position/velocity/current control circuit 16 based on the motor drive commands from the higher-level device 13.

The three-phase/dq conversion circuit 68 converts the input current feedback signals Iuf and Iwf to a d-axis current negative feedback signal Idf and a torque current feedback signal Iqf which are two vector signals whose dq axes are orthogonal to each other. The torque current feedback signal Iqf and the torque current command Iq are input to an addition/subtraction computing unit 51_5, and the addition/subtraction computing unit 51_5 computes the difference between the torque current command Iq and the torque current feedback signal Iqf. The deviation which is the difference obtained by this computing is amplified by a q-axis current control circuit (ACR) 65. A d-axis current command Id is a current command of a case in which weakened field control is carried out, the d-axis current command Id and the d-axis current negative feedback signal Idf are input to the addition/subtraction computing unit 51_5, and the addition/subtraction computing unit 51_5 computes the difference between the d-axis current command Id and the d-axis current negative feedback signal Idf. The deviation which is the difference obtained by computing is amplified by a d-axis current control circuit (ACR) 64.

A d-axis current command Vd which is an output of the d-axis current control circuit (ACR) 64 and a q-axis voltage command Vq which is an output of a q-axis current control circuit (ACR) 65 are input to the dq/three-phase conversion circuit 66. The dq/three-phase conversion circuit 66 converts the d-axis current command Vd and the q-axis voltage command Vq to three-phase voltage commands Vu, Vv, and Vw and outputs the commands to a PWM circuit 67. The output of the PWM circuit 67 is output through the drive circuit 61 as gate signals which drive the six switching elements 53 of the reverse converter 7, so that the motor 3 is controlled to follow the motor drive commands.

The total J=Jm+Jl of the inertia moment Jm of the AC motor 9 and the inertia moment Jl on the load side of the motor 3 converted in terms of motor axis is input to a parameter area 75 of the power conversion device 2 as the inertia moment J of the calculated value in test operation in the first embodiment. In this case, the inertia moment J stored in the parameter area 75 may be tuned by an auto-tuning function of the inertia moment J by a test operation function of the power conversion device 2. Also, if the power conversion device 2 has a function of tuning the inertia moment J in real time during operation (real time autotuning function), the inertia moment J in the parameter area 75 is changed and updated to the tuned values in real time by the function.

The CPU 72 of the position/velocity/current control circuit 16 can update the inertia moment J used in the acceleration/deceleration torque computing circuit 42 in real time by outputting the inertia moment J, which has been stored and updated in the parameter area 75 by tuning or the like, to the acceleration/deceleration torque computing circuit 42 of the stored energy computing circuit 14. Note that the values of these parameters at the point when the power supply is turned off are written in a non-volatile memory from a RAM memory, and are read from the non-volatile memory to the RAM memory when the power supply is turned on next time, whereby the updated inertia moment J is taken over.

In FIG. 13, 69 denotes a torque computing unit. The torque computing unit 69 calculates the torque detection signal Tq based on the d-axis current negative feedback signal Idf and the torque current feedback signal Iqf. Note that 1800 in the position/velocity/current control circuit 16 denotes a memory (memory device). This memory 1800 will be described in the second embodiment and is therefore not described herein.

The position/velocity/current control circuit 16 receives the position command θs, the torque command Ts, and the velocity command Ns as motor drive commands from the higher-level device 13, and outputs the angular velocity detection signal ω, the torque detection signal Tq, the inertia moment J, and the integral clear signals CLR1 and CLR2 to the stored energy computing circuit 14. Also, the position/velocity/current control circuit 16 outputs the lowered appropriate voltage Vadj, the velocity command ωcom, the target angular velocity ωref, the angular velocity detection signal ω, and the velocity deviation difference determination value ωerrjdg to the voltage assist amount computing block 80. In the position/velocity/current control circuit 16 illustrated in FIG. 13, the mode changing switch (Mod2) 74 outputs the velocity command ωcom and the target angular velocity ωref.

Figure 14:
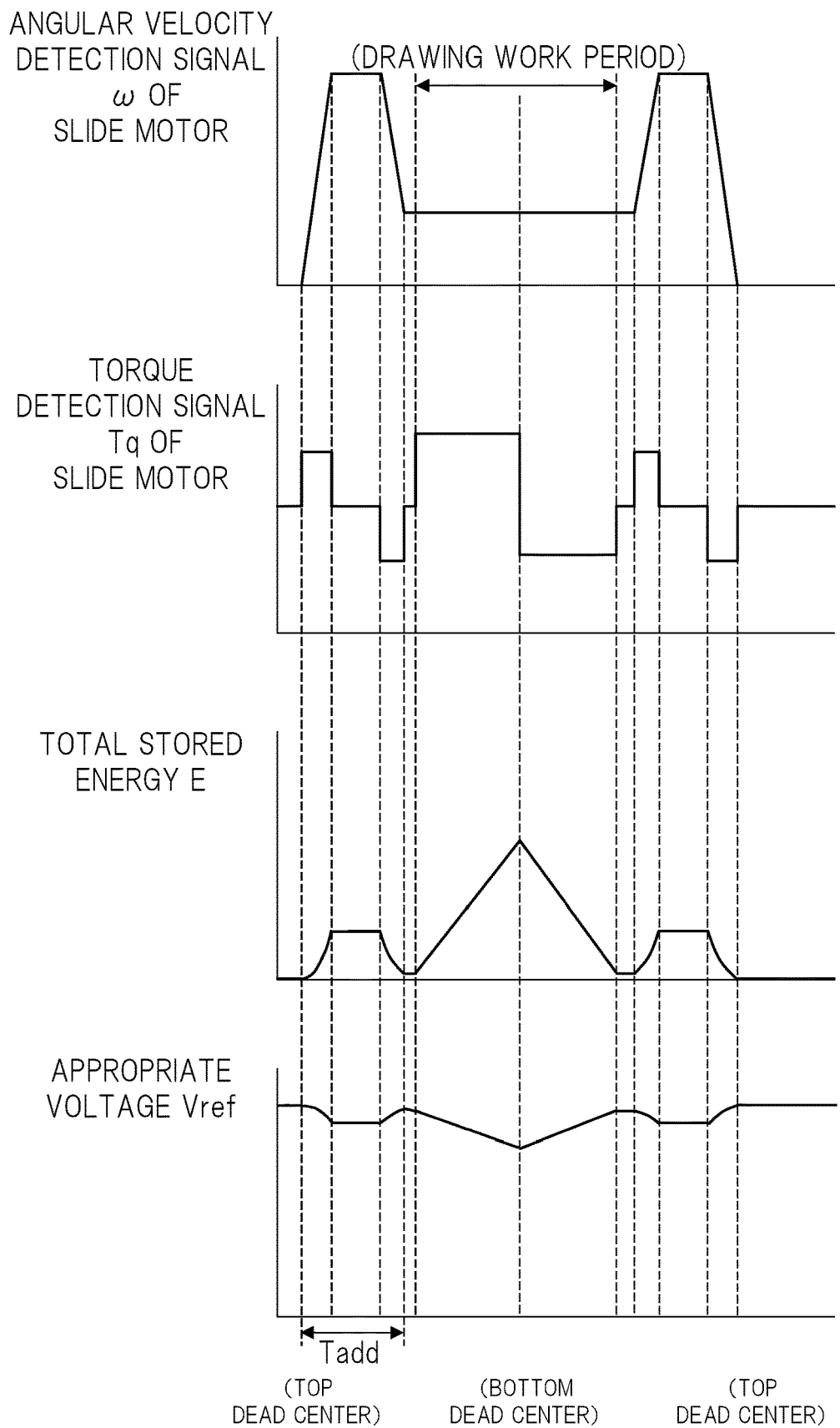
FIG. 14 is a waveform diagram for describing the power conversion system according to the first embodiment.

FIG. 14 is a waveform diagram for describing the power conversion system according to the first embodiment.

FIG. 14 illustrates examples of waveforms of the angular velocity detection signal, the torque detection signal, the total stored energy, and the appropriate voltage when drawing work is carried out by a press machine.

In the first embodiment, as illustrated in FIG. 13, the angular velocity detection signal ω and the torque detection signal Tq of the slide motor (motor 3) are output from the position/velocity/current control circuit 16. In drawing work, a blank material is sandwiched between an upper die on the side with the slide 25 (FIG. 13) and a lower die on the side with the pneumatic die cushion device 31 (FIG. 13), and compressive force is applied to the blank material from both upper and lower sides, that is, by the slide torque from the upper side and the upward reaction force from the lower side caused by the pneumatic die cushion device 31.

As illustrated in FIG. 14, at the beginning of the drawing work, the slide 25 starts descending at high speed from the top dead center and decelerates to medium speed immediately before contacting the pneumatic die cushion device 31. After the medium speed is obtained, the drawing work starts and the slide 25 passes the bottom dead center. Then, after the slide 25 switches to ascending and is separated from the pneumatic die cushion device 31, the angular velocity detection signal ω again accelerates to high speed and stops at the top dead center. Herein, the rotation of the slide motor is one-direction operation, but the operation direction of the slide 25 is switched to descending and ascending. Note that FIG. 14 illustrates the timing of the drawing work by the range of an arrow as a drawing work period at the medium speed.

As illustrated in FIG. 14, as the slide torque (torque detection signal Tq) in the period when the drawing work is not carried out, acceleration torque is generated on the positive side during acceleration, and deceleration torque is generated on the negative side during deceleration. In other words, acceleration/deceleration torque is generated only when the angular velocity is changed. When the drawing work period starts, since the slide 25 gradually presses the compressed air of the pneumatic die cushion device 31 while descending, elastic energy is stored, and the slide torque of the slide motor is gradually increased in the positive direction. At the bottom dead center, the pressing torque becomes zero, resulting in a state in which the reaction force from the pneumatic die cushion device 31 is received. When the slide 25 passes the bottom dead center to switch to ascending, since the slide torque (torque detection signal Tq) maintains the medium speed because of the increased reaction force of the pneumatic die cushion device 31, the torque is switched to regenerative brake torque in the negative direction. When the slide 25 is separated from the pneumatic die cushion device 31, the stored elastic energy is released, and the regenerative torque is rapidly reduced to zero. In FIG. 14, in the part illustrated by the range of the arrow as the drawing work period, die cushion torque is generated.

As an example of the total stored energy E, the output waveform of the addition computing unit 50_1 of the stored energy computing circuit 14 (FIG. 10) when the drawing work is carried out by the press machine is illustrated in FIG. 14. The waveform of this total stored energy E just corresponds to the waveform of the sum of the inertial load stored energy Ea and the elastic load stored energy Ed.

Also, FIG. 14 illustrates an example of the waveform of the appropriate voltage Vref in the voltage command computing circuit 15 (FIG. 10) when the drawing work is carried out by the press machine. In a zone Tadd of FIG. 14, the torque detection signal Tq is applied until the angular velocity detection signal ω of the slide motor reaches the target angular velocity ωref. Along with the application of the torque detection signal Tq, the angular velocity detection signal ω increases, and the appropriate voltage Vref is restricted as the total stored energy E increases. If the appropriate voltage Vref is restricted, the angular velocity represented by the angular velocity detection signal ω may not reach the target angular velocity ωref because the motor characteristics NT are lowered as illustrated in FIG. 9(B).

Figure 15:
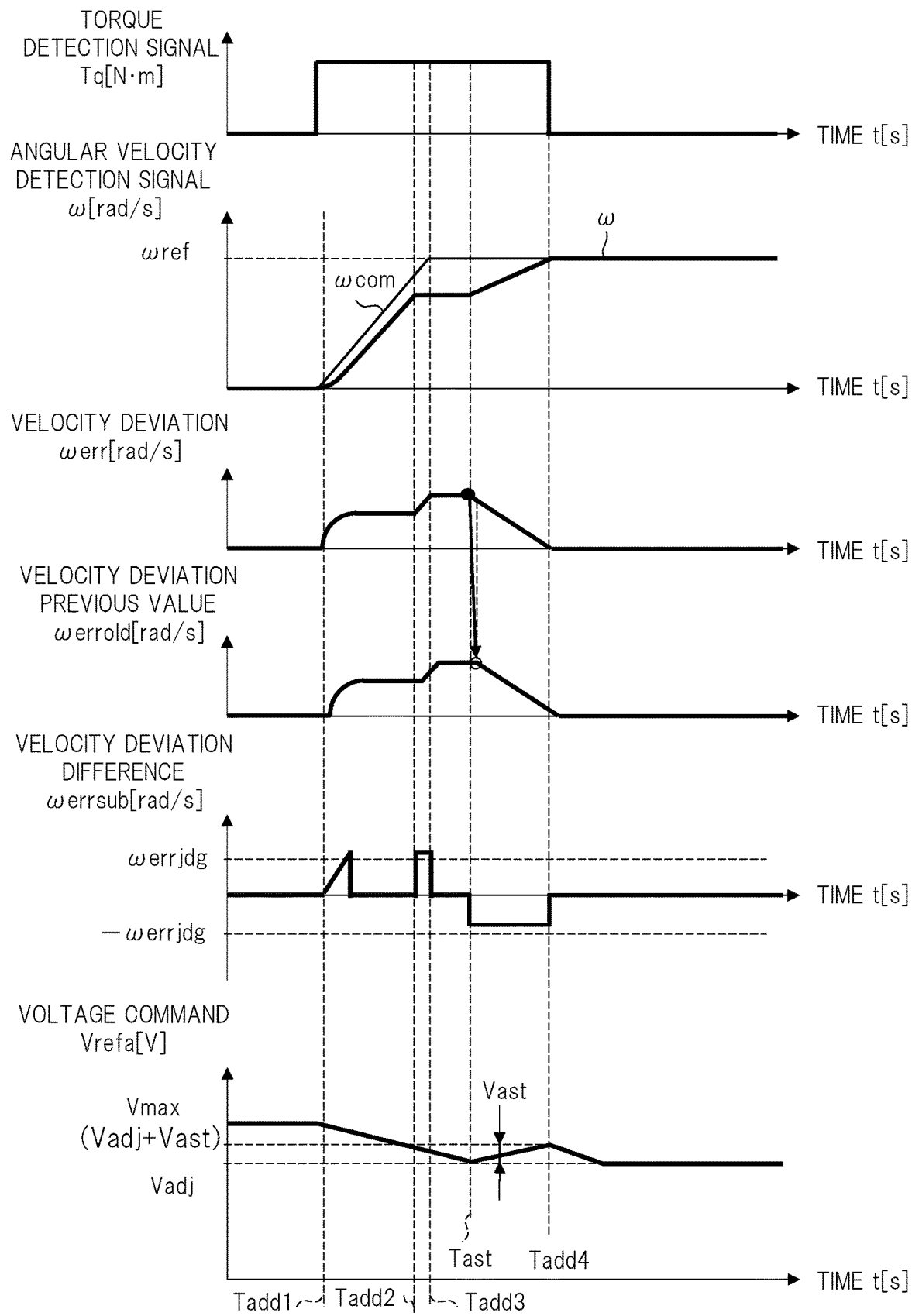
FIG. 15 is a waveform diagram for describing the power conversion system according to the first embodiment.

The zone Tadd will be described in more detail with reference to the drawings. FIG. 15 is a waveform diagram for describing the power conversion system according to the first embodiment. FIG. 15 illustrates the waveforms of the torque detection signal Tq, the angular velocity detection signal ω, and the appropriate voltage (voltage command) Vrefa and the waveform related to the velocity deviation in the zone Tadd illustrated in FIG. 14. FIG. 14 illustrates the appropriate voltage Vref input to the addition computing unit 50_2 illustrated in FIG. 10 as the appropriate voltage, but FIG. 15 illustrates the voltage command Vrefa output from the addition computing unit 50_2 to the addition/subtraction computing unit 51_3 as the appropriate voltage.

Means of determining whether the increase of the appropriate voltage Vref is necessary in the case in which the angular velocity does not reach the target angular velocity ωref during the zone Tadd and effects thereof will be described with reference to FIG. 15.

In FIG. 15, at time Tadd1, the torque detection signal Tq is applied until the angular velocity detection signal ω of the slide motor reaches the target angular velocity ωref. The angular velocity detection signal ω is increased along with application of the torque detection signal Tq in accordance with the velocity command ωcom. However, at the point of time Tadd2, the angular velocity detection signal ω does not reach the velocity command ωcom due to reduction in the motor characteristics NT. Namely, the angular velocity does not reach the target angular velocity ωref.

A velocity deviation ωerr illustrated in FIG. 15 is a difference value between the velocity command ωcom and the angular velocity detection signal ω. Since the angular velocity detection signal ω increases in accordance with the velocity command ωcom until the time Tadd2, the velocity deviation ωerr is constant. However, when reaching the time Tadd2, the angular velocity detection signal ω becomes a constant velocity while the velocity command ωcom keeps increasing until the target angular velocity ωref, so that the velocity deviation ωerr further increases.

In FIG. 15, a velocity deviation difference value ωerrsub represents the difference between the value of the previously measured velocity deviation (previous value of velocity deviation) and the velocity deviation of this time. The velocity deviation difference value ωerrsub will be described by using (Equation 26).

[Mathematical Expression 26]

$$\omega errsub = \omega err - \omega errold \quad \text{(Equation 26)}$$

A velocity deviation previous value ωerrold is the previous value of the velocity deviation ωerr. The difference between the velocity deviation ωerr and the velocity deviation previous value ωerrold is the velocity deviation difference value ωerrsub.

The velocity command ωcom increases between the time Tadd2 and time Tadd3, but the velocity deviation ωerr gradually increases because the angular velocity detection signal ω has a constant velocity, and the velocity deviation difference value ωerrsub is generated in accordance with (Equation 26). In FIG. 15, the velocity deviation difference value ωerrsub equal to or higher than the velocity deviation difference determination value ωerrjdg is an indication that the angular velocity represented by the angular velocity detection signal ω has not reached the target angular velocity ωref. In this case, the torque detection signal Tq keeps outputting constant torque because the angular velocity detection signal ω has not reached the target angular velocity ωref.

In the first embodiment, if the velocity deviation difference value ωerrsub maintains a constant value in a certain period in a state in which the torque detection signal Tq keeps outputting certain torque or higher and the appropriate voltage Vref is restricted, it is determined that the angular velocity represented by the angular velocity detection signal ω does not reach the target angular velocity ωref due to reduction in the motor characteristics NT, and the voltage assist amount Vast is gradually increased at time Tast.

Along with the increase in the voltage assist amount Vast, the appropriate voltage Vrefa increases toward a post-assist appropriate voltage (Vadj+Vast). Therefore, the motor characteristics NT restore as illustrated in FIG. 9(C), and the angular velocity represented by the angular velocity detection signal ω increases toward the target angular velocity ωref. When the angular velocity reaches the target angular velocity ωref, since it is no longer necessary to temporarily increase the motor characteristics NT, the voltage assist amount Vast is reduced at time Tadd4 to lower the appropriate voltage Vrefa to the lowered appropriate voltage Vadj. Herein, even if the appropriate voltage Vrefa is simply reduced, the actual PT-NT voltage VPN is not reduced in accordance with the appropriate voltage Vrefa. However, since the electric power consumed by constant-velocity operation of the motor is generated, the actual PT-NT voltage VPN follows the appropriate voltage Vrefa.

<<Determination Process of Voltage Assist>>

Figure 16:
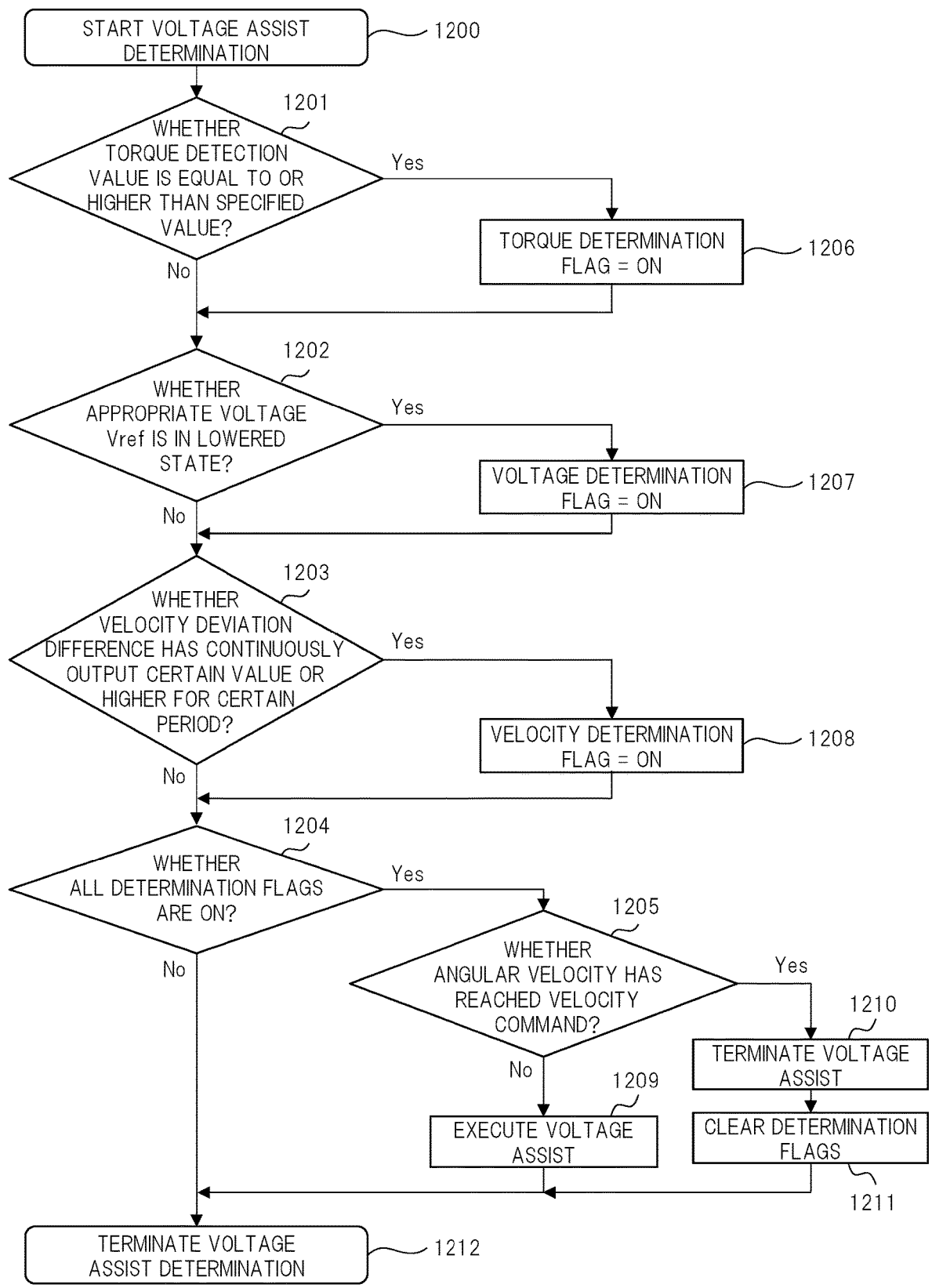
FIG. 16 is a flowchart diagram illustrating the process carried out in the power conversion system according to the first embodiment.

Next, a determination process for determining whether voltage assist is to be carried out or not will be described with reference to the drawing. FIG. 16 is a flowchart diagram illustrating the process carried out in the power conversion system according to the first embodiment. FIG. 16 illustrates an example of the determination process for carrying out the voltage assist.

The voltage assist determination process starts voltage assist determination at step 1200 and proceeds to a torque determination step 1201. In the torque determination step 1201, whether the torque detection value indicated by the torque detection signal Tq is equal to or higher than a specified value or not is determined. If the torque detection value is equal to or higher than the specified value, it is determined that the motor characteristics may be lowered because certain torque is output, and the process proceeds to a torque determination setting step 1206. In this torque determination setting step 1206, a torque determination flag is set to ON. After the torque determination setting step 1206 or when the torque detection value is determined to be lower than the specified value in the torque determination step 1201, the process proceeds to an appropriate voltage determination step 1202 in order to carry out next determination. As an example of the specified value used in the torque determination step 1201, T1max described in FIG. 8, that is, the lowered torque T1max or the like capable of outputting with the maximum angular velocity after the motor characteristics are lowered can be presented.

In the appropriate voltage determination step 1202, whether the appropriate voltage Vref is in a restricted state or not is determined. For example, as a determination condition of the restricted state, the appropriate voltage Vref is determined to be in a restricted state when the appropriate voltage Vref is lowered by a certain amount. In the example shown in FIG. 15, for example, when the appropriate voltage Vref reaches the lowered appropriate voltage Vadj, it is determined to be in the restricted state.

When the appropriate voltage Vref is in the restricted state, it is determined that the motor characteristics may be lowered, the process proceeds to a voltage determination setting step 1207, and a voltage determination flag is set to ON.

After the voltage determination setting step 1207 or when the appropriate voltage Vref is determined not to be in the restricted state in the appropriate voltage determination step 1202, the process proceeds to a velocity deviation determination step 1203 in order to carry out next determination. In the velocity deviation determination step 1203, it is determined whether or not the velocity deviation difference value ωerrsub has continuously output a certain value or higher for a certain period. As illustrated in FIG. 15, if the angular velocity represented by the angular velocity detection signal ω does not reach the target angular velocity ωref, the velocity deviation difference value ωerrsub becomes the value equal to or higher than the certain value while the velocity command ωcom is increasing. In the example shown in FIG. 15, if the velocity deviation difference value ωerrsub is equal to or higher than the velocity deviation difference determination value ωerrjdg between the time Tadd2 and the time Tadd3, it is determined that the angular velocity has not reached the target angular velocity ωref, and the process proceeds to a velocity determination setting step 1208. In this velocity determination setting step 1208, a velocity determination flag is set to ON.

After the velocity determination setting step 1208 or when the angular velocity detection signal ω is reaching the velocity command ωcom in the velocity deviation determination step 1203 or when this determination step is being processed, the process proceeds to a flag determination step 1204 in order to carry out next determination.

In the flag determination step 1204, if the torque determination flag is ON, the voltage determination flag is ON, and the velocity determination flag is ON, it is determined that the motor characteristics NT have been lowered because the appropriate voltage Vref is restricted and the angular velocity represented by the angular velocity detection signal ω does not reach the target angular velocity ωref, and the process proceeds to a velocity reach determination step 1205. If any of the torque determination flag, the voltage determination flag, and the velocity determination flag is OFF, it is determined that the voltage assist amount Vast is not necessary, the process proceeds to a step 1212, and the voltage assist determination is terminated.

In the velocity reach determination step 1205, it is determined whether the angular velocity represented by the angular velocity detection signal ω has reached the target angular velocity (command velocity) ωref or not. As an example of the determination method, it is determined that the angular velocity has reached the target angular velocity when the angular velocity represented by the angular velocity detection signal ω is equal to the target angular velocity ωref.

When the angular velocity represented by the angular velocity detection signal ω does not reach the target angular velocity ωref, the process proceeds to a voltage assist step 1209, and the voltage assist is carried out. In the voltage assist carried out in the voltage assist step 1209, the voltage assist amount Vast can be gradually increased as illustrated in FIG. 15.

If it is determined in the velocity reach determination step 1205 that the angular velocity represented by the angular velocity detection signal ω has reached the target angular velocity ωref, the process proceeds to a voltage assist termination step 1210, and the voltage assist is terminated.

When the voltage assist is terminated, for example, the voltage assist amount Vast is gradually reduced. After the voltage assist termination step 1210, the torque determination flag=OFF, the voltage determination flag=OFF, and the velocity determination flag=OFF are set in a determination flag clear step 1211 so as to terminate the voltage assist and carry out setting to enable new voltage assist determination. Namely, after the voltage assist termination step 1211, the process proceeds to a termination step 1212, and the voltage assist determination is terminated.

As is understood also from FIG. 13, the torque detection signal Tq and the angular velocity detection signal ω are calculated based on the information from the encoder 10 and the detection currents from the current detectors 59 and 60. Further, the appropriate voltage Vref is calculated based on the energy stored in the storage device 6. Therefore, whether the characteristics of the motor 3 are restricted or not can be regarded as being determined by the computation of the information from the encoder 10, the detection currents from the current detectors 59 and 60, and the energy stored in the storage device 6.

<<Configuration of Voltage Assist Amount Computing Block>>

Figure 17:
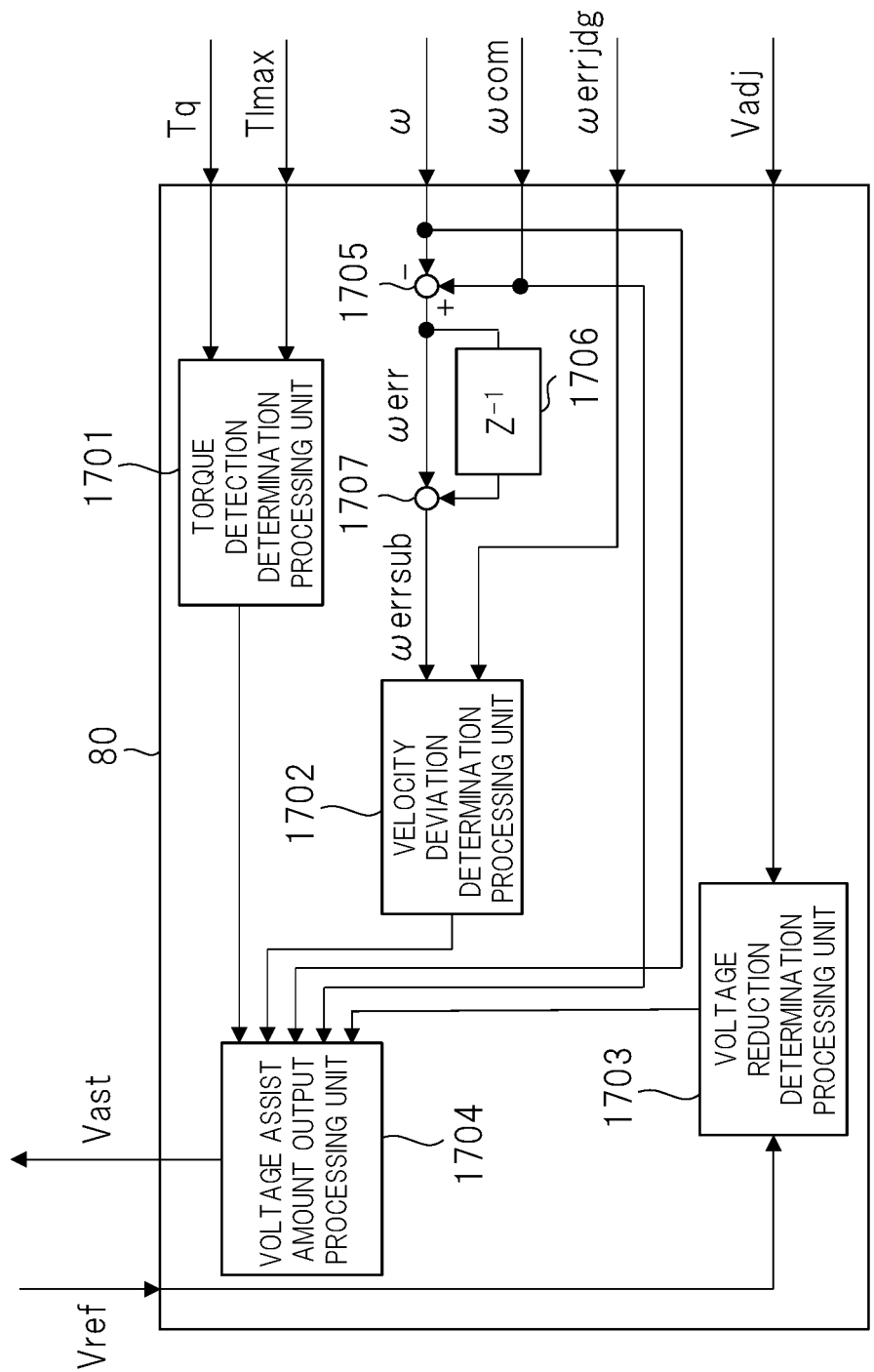
FIG. 17 is a block diagram illustrating a configuration of a voltage assist amount computing block according to the first embodiment.

FIG. 17 is a block diagram illustrating a configuration of the voltage assist amount computing block according to the first embodiment. It is possible to regard FIG. 17 as illustrating a configuration which executes the voltage assist determination process described in FIG. 16.

The torque detection signal Tq, the angular velocity detection signal ω, the velocity command ωcom, the velocity deviation difference determination value ωerrjdg, and the lowered appropriate voltage Vadj are supplied from the position/velocity/current control circuit 16 described in FIG. 13 to the voltage assist amount computing block 80. Also, the lowered torque T1max and the appropriate voltage Vref described in FIG. 8 are supplied to the voltage assist amount computing block 80, and the voltage assist amount computing block 80 outputs the voltage assist amount Vsat based on these signals.

In the first embodiment, the voltage assist amount computing block 80 includes a voltage detection determination processing unit 1701, a velocity deviation determination processing unit 1702, a voltage reduction determination processing unit 1703, a voltage assist amount output processing unit 1704, subtraction processing units 1705 and 1707, and a previous value saving processing unit 1706.

The torque detection signal Tq and the lowered torque T1max are input to the torque detection determination processing unit 1701. The torque detection determination processing unit 1701 determines whether the value of the torque detection signal Tq has exceeded the lowered torque T1max while using the lowered torque T1max as the specified value, and outputs the torque determination flag of ON or OFF depending on the determination result.

The angular velocity detection signal ω and the target angular velocity ωref are input to the subtraction processing unit 1701. The subtraction processing unit 1701 calculates the velocity deviation ωerr between the target angular velocity ωref and the angular velocity detection signal ω. The calculated velocity deviation ωerr is saved in the previous value saving processing unit 1706. The velocity deviation saved in the previous value saving processing unit 1706 and the velocity deviation between the angular velocity detection signal ω measured in next measurement and the target angular velocity ωref are subjected to subtraction by the subtraction processing unit 1707, and the difference between the velocity deviations obtained by this subtraction is output as the velocity deviation difference value ωerrsub from the subtraction processing unit 1707.

The velocity deviation difference value ωerrsub and the velocity deviation difference determination value ωerrjdg are input to the velocity deviation determination processing unit 1702. The velocity deviation determination processing unit 1702 compares the velocity deviation difference value ωerrsub with the velocity deviation difference determination value ωerrjdg, thereby determining whether or not the velocity deviation difference value ωerrsub has exceeded the velocity deviation difference determination value ωerrjdg for a certain period. The velocity deviation determination processing unit 1702 outputs the velocity determination flag of ON or OFF depending on the determination result.

The appropriate voltage Vref and the lowered appropriate voltage Vadj are input to the voltage reduction determination processing unit 1703. The voltage reduction determination processing unit 1703 compares the appropriate voltage Vref with the lowered appropriate voltage Vadj to determine whether the appropriate voltage Vref is in a lowered state or not, and outputs the voltage determination flag of ON or OFF depending on the determination result.

The voltage assist amount output processing unit 1704 receives inputs of the torque determination flag, the voltage determination flag, and the velocity determination flag from the processing units described above, and carries out the voltage assist amount output process. This voltage assist amount output process is the process corresponding to steps 1204, 1205, and 1209 to 1211 illustrated in FIG. 16. Namely, the voltage assist amount output processing unit 1704 executes the process corresponding to steps 1204, 1205, and 1209 to 1211 illustrated in FIG. 16. As a result, the voltage assist amount output processing unit 1704 outputs the voltage assist amount Vast of the value corresponding to the determination. In the power conversion system 200 illustrated in FIG. 10, the voltage assist amount Vast output from the voltage assist amount computing block 80 is added to the appropriate voltage Vref by the addition computing unit 50_2. In this manner, when voltage assist is required, the appropriate voltage Vrefa supplied to the PI regulator 17 via the addition/subtraction computing unit 51_3 can be changed to be increased. Namely, when the motor characteristics are to be raised, the voltage command for the step-up/down power supply circuit 5 can be increased (raised), and the control amount with respect to the storage device 6 can be increased.

Second Embodiment

In the second embodiment, the motor characteristics are measured in advance, and a motor characteristics increase determination region is set from the obtained motor characteristics. Though not particularly limited, this motor characteristics increase determination region is stored in the memory 1800 illustrated in FIG. 13 in the second embodiment. In the second embodiment, when the motor characteristics reach the motor characteristics increase determination region while the motor 3 is in operation, the control amount with respect to the storage device 6 is increased by the voltage assist.

Figure 18:
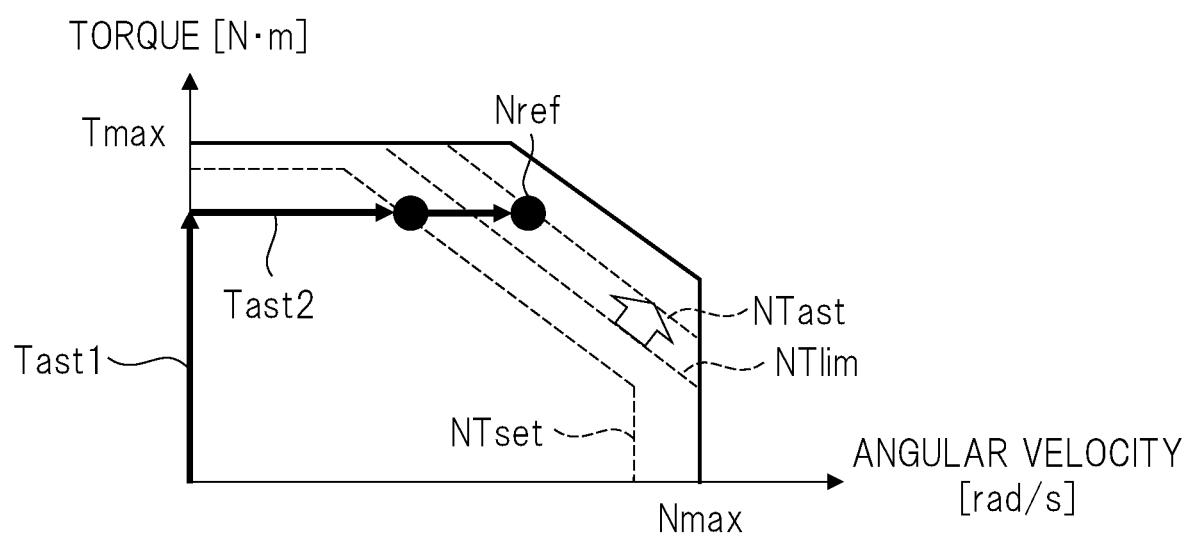
FIG. 18 is a diagram for describing a power conversion system according to the second embodiment.

FIG. 18 is a diagram for describing a power conversion system according to the second embodiment. FIG. 18 is similar to FIG. 9.

In FIG. 18, NTset denotes the set motor characteristics increase determination region. In FIG. 18, in an acceleration torque application zone Tast1, acceleration torque for driving the motor 3 is generated by supplying a motor current.

In a velocity increase zone Tast2, the angular velocity is increased by the acceleration torque generated in the acceleration torque application zone Tast1. The CPU 72 illustrated in FIG. 13 determines whether the appropriate voltage Vref is in a restricted state or not. If the appropriate voltage Vref is in the restricted state, the CPU 72 determines whether the motor characteristics have reached the motor characteristics increase determination region NTset or not. For example, the CPU 72 obtains the motor characteristics based on the information from the encoder 10 and the motor current detected by the current detectors 59 and 60 and determines whether or not the obtained motor characteristics have reached the motor characteristics increase determination region NTset.

If it is determined that the motor characteristics have reached the motor characteristics increase determination region NTset, the CPU 72 increases the voltage assist amount Vast and increases the appropriate voltage Vrefa. For example, the CPU 72 operates the voltage command computing circuit 15 so as to increase the voltage assist amount Vast which is added to the appropriate voltage Vref as described above. As a result, the appropriate voltage Vrefa is increased, and the angular velocity of the motor 3 can reach the target angular velocity ωref without stopping in the region of the lowered motor characteristics NTlim. Namely, even when the appropriate voltage Vref is restricted, the motor characteristics can be improved by temporarily increasing the appropriate voltage (voltage command) Vrefa, which instructs the voltage value to the step-up/down power supply circuit 5, and temporarily increasing the control amount of the storage device 6.

The determination carried out in the first embodiment and the second embodiment such as the addition determination and addition process of the voltage assist amount may be instructed by the input from the higher-level device 13 or an external device other than the CPU built in the device, or these process and determination may be carried out by the higher-level device 13 or the external device.

Also, the lowered appropriate voltage Vadj and/or the velocity deviation difference determination value ωerrjdg illustrated in FIG. 13 may be input from, for example, the higher-level device 13 instead of the position/velocity/current control circuit 16. Furthermore, FIG. 15 illustrates an example in which the voltage assist amount Vsat linearly rises from the time Tast, but how the voltage assist amount Vsat rises is not particularly limited.

In the power conversion system 200 illustrated in FIG. 10, when the motor 3 starts rotating, the total stored energy E is calculated sequentially by the control circuit 8. At this time, since the output shaft of the motor 3 rotates forward, the energy of powered drive is calculated as the total stored energy E. Also, in the power conversion system 200, even in the period in which the output shaft of the motor 3 is rotated reversely by the motor load 12, the control circuit 8 calculates the total stored energy E. The total stored energy E at this time is the energy of regeneration. In both of the periods, that is, the period in which the output shaft of the motor 3 rotates forward and the period in which the output shaft rotates reversely, the voltage command computing circuit 15 illustrated in FIG. 10 calculates the appropriate voltage Vrefa, which is supplied to the addition/subtraction computing unit 51_3, based on the total stored energy E output from the control circuit 8.

In the embodiment, the motor characteristics are temporarily improved when the output shaft of the motor 3 is rotating forward (powered drive). Therefore, it is sufficient if the calculation of the total stored energy E and the control of the appropriate voltage Vrefa based thereon are carried out only in the period of the forward rotation. However, since the total stored energy E and the appropriate voltage Vrefa are different in the case of the forward rotation and the case of the reverse rotation, it is desirable to carry out the calculation of the total stored energy E and the calculation of the appropriate voltage Vrefa in both the powered drive and the regeneration as in the embodiment in order to suitably charge the storage device 6.

Note that the flags (torque determination flag, voltage determination flag, and velocity determination flag) described in FIG. 16 and FIG. 17 are not particularly limited, but are provided in the CPU 72 illustrated in FIG. 13.

In the foregoing, the invention accomplished by the present inventors have been described in detail based on the embodiments. However, the present invention is not limited to the embodiments described above, and it goes without saying that various modifications can be made within the scope not departing from the gist thereof.

REFERENCE SIGNS LIST

1 power supply device
2 power conversion device
3 motor
4 converter
5 step-up/down power supply circuit
6 storage device
7 reverse converter
8 control circuit
9 AC motor
10 encoder
11 power supply
12 motor load
13 higher-level device
14 stored energy computing circuit
15 voltage command computing circuit
16 position/velocity/current control circuit
17 PI regulator
18 isolated amplifier
19 drive circuit
80 voltage assist amount computing block
E total stored energy
J inertia moment
Tq torque detection signal
Vadj lowered appropriate voltage
Vast voltage assist amount
Vref, Vrefa appropriate voltage
ω angular velocity detection signal
ωcom velocity command
ωerrjdg velocity deviation difference determination value
ωref target angular velocity

The invention claimed is:

1. A power conversion system comprising: a power conversion device configured to supply electric power to a motor; and a power supply device configured to supply electric power to the power conversion device,
wherein the power conversion device includes:
a power conversion unit configured to convert the electric power;
a control unit configured to control the power conversion unit; and
a current detection unit configured to detect a current flowing through the power conversion unit, wherein the power supply device includes:
  a storage device configured to store electric power in accordance with a voltage;
  a step-up/down power supply circuit configured to change the voltage of the storage device based on a voltage command; and
  a computing circuit configured to compute energy stored in the storage device and output it as the voltage command to the step-up/down power supply circuit,
wherein the control unit calculates powered drive energy of the motor by using information from an encoder of the motor and a current value detected by the current detection unit,
wherein the computing circuit computes the energy stored in the storage device based on the powered drive energy calculated by the control unit, and
wherein when it is determined by the computation of the current value detected by the current detection unit, the information from the encoder, and the energy stored in the storage device that characteristics of the motor are restricted, the computing circuit temporarily changes the voltage command to increase the characteristics of the motor.

2. The power conversion system according to claim 1,
wherein the control unit calculates an angular velocity and torque of the motor by using the information from the encoder and the current value detected by the current detection unit, calculates the powered drive energy of the motor by using the angular velocity, the torque, and an inertia moment value set in advance, and determines the characteristics of the motor.

3. The power conversion system according to claim 2,
wherein the voltage command is temporarily changed to increase a control command amount for the storage device, thereby restoring the characteristics of the motor.

4. A power conversion system comprising: a power conversion device configured to supply electric power to a motor; and a power supply device configured to supply electric power to the power conversion device,
wherein the power conversion device includes:
  a power conversion unit configured to convert the electric power;
  a control unit configured to control the power conversion unit; and
  a current detection unit configured to detect a current flowing through the power conversion unit,
wherein the power supply device includes:
  a storage device configured to store electric power in accordance with a voltage;
  a step-up/down power supply circuit configured to change the voltage of the storage device based on a voltage command; and
  a computing circuit configured to compute energy stored in the storage device and output it as the voltage command to the step-up/down power supply circuit,
wherein the control unit includes a memory device in which motor characteristics of the motor are stored in advance, and
wherein when it is determined by using information from an encoder of the motor and a current value detected by the current detection unit that the motor characteristics correspond to the motor characteristics stored in the memory device, the control unit causes the computing circuit to increase a control command amount for the storage device to temporarily increase the motor characteristics.

5. A motor control method based on a power conversion system comprising a power conversion device configured to supply electric power to a motor and a power supply device configured to supply electric power to the power conversion device,
wherein the power conversion device includes a power conversion unit configured to convert electric power, a current detection unit configured to detect a current flowing through the power conversion unit, and a control unit configured to calculate powered drive energy of the motor by using information from the motor and a current value from the current detection unit, and
wherein the power supply device includes a storage device that is coupled to the power conversion unit and is configured to store electric power in accordance with a voltage, a step-up/down power supply circuit configured to change the voltage of the storage device based on a voltage command, and a computing circuit configured to compute energy stored in the storage device based on the powered drive energy calculated by the control unit and output it as the voltage command to the step-up/down power supply circuit,
the motor control method comprising:
  a torque determination step of determining whether a torque of the motor is equal to or higher than a predetermined value or not;
  a command value determination step of determining whether the voltage command is in a lowered state or not;
  a velocity deviation determination step of determining whether a velocity deviation difference of the motor is equal to or higher than a predetermined value or not in a predetermined period;
  a velocity command determination step of determining whether an angular velocity of the motor has reached a command velocity or not; and
  a voltage assist step of increasing the voltage command when it is determined that the torque exceeds the predetermined value in the torque determination step, when it is determined that the voltage command is in the lowered state in the command value determination step, when it is determined that the velocity deviation is equal to or higher than the predetermined value in the predetermined period in the velocity deviation determination step, and when it is determined that the angular velocity has not reached the command velocity in the velocity command determination step.

6. The motor control method according to claim 5, further comprising a voltage assist termination step of reducing the voltage command when it is determined that the angular velocity of the motor has reached the command velocity in the velocity command determination step after the voltage assist step.

7. The motor control method according to claim 6,
wherein the power conversion system includes:
  a torque determination flag set in accordance with a determination result of the torque determination step;
  a voltage determination flag set in accordance with a determination result of the command value determination step; and
  a velocity determination flag set in accordance with a determination result of the velocity deviation determination step, the motor control method further comprising a flag clear step of clearing the torque determination flag, the voltage determination flag, and the velocity determination flag, the flag clear step being executed after the voltage assist termination step.

* * * * *